US006415355B1

(12) United States Patent
Hirofuji

(10) Patent No.: US 6,415,355 B1
(45) Date of Patent: Jul. 2, 2002

(54) COMBINED DISK ARRAY CONTROLLER AND CACHE CONTROL METHOD FOR PARITY GENERATION MODE AND DATA RESTORATION MODE

(75) Inventor: Susumu Hirofuji, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/306,992

(22) Filed: May 7, 1999

(30) Foreign Application Priority Data

May 11, 1998 (JP) ........................................... 10-127439
Oct. 2, 1998 (JP) ........................................... 10-281249

(51) Int. Cl.⁷ .............................................. G06F 12/08
(52) U.S. Cl. ........................... 711/114; 711/113; 714/7; 714/805; 710/22
(58) Field of Search .................................. 711/122, 114, 711/113, 154; 714/6, 7, 1, 5, 803, 799, 805; 710/22

(56) References Cited

U.S. PATENT DOCUMENTS

| | | | | |
|---|---|---|---|---|
| 5,463,765 A | * | 10/1995 | Kakuta et al. | 714/6 |
| 5,572,660 A | * | 11/1996 | Jones | 714/6 |
| 5,838,892 A | * | 11/1998 | Wilson | 714/6 |
| 5,996,046 A | * | 11/1999 | Yagisawa et al. | 711/114 |
| 6,006,308 A | * | 12/1999 | Matsunami et al. | 711/114 |
| 6,012,123 A | * | 1/2000 | Pecone et al. | 711/114 |
| 6,151,641 A | * | 11/2000 | Herbert | 710/22 |
| 6,161,165 A | * | 12/2000 | Solomon et al. | 711/114 |
| 6,269,424 B1 | * | 7/2001 | Katsuragi et al. | 711/114 |

FOREIGN PATENT DOCUMENTS

JP 10-78854 3/1998
JP 410111762 A * 4/1998

OTHER PUBLICATIONS

Menon et al., "The Architecture of a Fault–Tolerant Cached RAID Controller", ACM SIGARCH Computer Architecture News, Proceedings International Symposium on Computer Architecture, vol. 21, pp. 76–87, May 1993.*
Chen et al., "RAID: High–Performance, Reliable Secondary Storage", ACM Computing Surveys (CSUR), vol. 26, pp. 145–185, Jun. 1994.*

* cited by examiner

Primary Examiner—Matthew Kim
Assistant Examiner—Pierre-Michel Bataille
(74) Attorney, Agent, or Firm—Finnegan, Henderson, Farabow, Garrett & Dunner, L.L.P.

(57) ABSTRACT

Upon receiving an access command designated with a parity generation mode from a main controller upon update data transfer from a host apparatus, a cache controller reads out update data from that location in a block in an update data area in a cache memory, which is designated by the command, and writes the readout data in a FIFO memory. The cache controller then reads out data before update from that location in a block in a data before update area, which is present in an identical block column, EX-ORs the readout data and the contents stored in the FIFO memory, and writes the obtained EX-OR in the FIFO memory. The cache controller reads out parity before update from that location in a block in a parity before update area, which is one block ahead of the block in the data before update area, and EX-ORs the readout parity and the contents of the FIFO memory to generate parity data.

17 Claims, 18 Drawing Sheets

| | 0 | 1 | 2 | 3 | 15 | |
|---|---|---|---|---|---|---|
| | 0000000 ① 0003FFF | 0010000 ⑤ 0013FFF | 0020000 ⑨ 0023FFF | 0030000 ⑬ 0033FFF | 00F0000 ㊿ 00F3FFF | |
| | 0004000 ② 0007FFF | 0014000 ⑥ 0017FFF | 0024000 ⑩ 0027FFF | 0034000 ⑭ 0037FFF | 00F4000 ㊽ 00F7FFF | |
| | 0008000 ③ 000BFFF | 0018000 ⑦ 001BFFF | 0028000 ⑪ 002BFFF | 0038000 ⑮ 003BFFF | 00F8000 ㊻ 00FBFFF | |
| | 000C000 ④ 000FFFF | 001C000 ⑧ 001FFFF | 002C000 ⑫ 002FFFF | 003C000 ⑯ 003FFFF | 00FC000 ㊼ 00FFFFF | |
| | 0100000 ㊽ 0103FFF | 0104000 ㊺ 0107FFF | 0108000 ㊿ 010BFFF | 010C000 ㊽ 010FFFF | 013C000 ⑳ 013FFFF | |
| | 0140000 ㊶ 0143FFF | 0144000 ㊷ 0147FFF | 0148000 ㊸ 014BFFF | 014C000 ㊹ 014FFFF | 017C000 ⑨ 017FFFF | |

| ADDRESS | FUNCTION |
|---|---|
| 0000 0000-3FFF FFFF | AREA USED BY MICROPROCESSOR |
| 4000 0000-BFFF FFFF | CACHE DATA STORAGE AREA |
| E000 0000-E000 FFFF | SET REGISTER |
| F000 0000-FFFF FFFF | AREA USED BY MICROPROCESSOR |

COMBINED DISK ARRAY CONTROLLER AND CACHE CONTROL METHOD FOR PARITY GENERATION MODE AND DATA RESTORATION MODE

BACKGROUND OF THE INVENTION

This application is based on Japanese Patent Application No. 10-127439, filed May 11, 1998, and Japanese Patent Application No. 10-281249, filed Oct. 2, 1998, the contents of which are incorporated herein by reference.

The present invention relates to a disk array apparatus having a plurality of disk drives and, more particularly, to a disk array controller which comprises a cache memory for temporarily storing transfer data between a disk drive and host apparatus, and controls access to the disk drives, and a cache control method applied to the controller.

A disk array apparatus is known as an external storage device, which comprises a plurality of disk drives, achieves high-speed access by parallelly driving the plurality of disk drives, and improves reliability by a redundant arrangement.

A disk array apparatus of this type generates parity data as data correction information for write data transferred from a host apparatus, and writes that data in one of the plurality of disk drives. Hence, even when a failure has occurred in one of the plurality of disk drives, data in the failed disk drive can be restored using the stored parity data and data in the remaining disk drives.

As one data redundancy scheme using parity or the like, RAID (Redundant Arrays of Inexpensive Disks) is known. RAID has various levels depending on the arrangements of disk array apparatuses; levels 3 and 5 are prevalent. RAID of level 3 is called RAID3, and is suitable for sequential access (or jobs that require such access) for large data transfers. On the other hand, RAID of level 5 is called RAID5, and is suitable for random access (or jobs that require such access), i.e., frequent read/write access of small data.

The disk array apparatus normally has a cache memory (disk cache) for temporarily storing transfer data between the disk drive and host apparatus. In such arrangement, when target data is present in the cache memory, the target data can be accessed at high speed from the cache memory without accessing the disk drives (i.e., without mechanically accessing them) irrespective of the RAID levels (RAID3, RAID5, and the like).

In RAID3, update parity is generated by segmenting update data transferred from the host apparatus. By contrast, in RAID5, update parity is generated using update data transferred from the host apparatus, data before update, which is stored in a given area of the disk drive where the update data is to be stored, and parity before update (parity data) stored in a given area of another disk drive corresponding to the storage location of the update data.

In a conventional disk array controller, generating update parity for update data transferred from the host apparatus must be implemented by a firmware program in the controller or the controller itself must be configured as a dedicated hardware apparatus. However, implementation by firmware suffers a problem of limited processing speed, and that by dedicated hardware suffers a problem of a complicated circuit.

Hence, the present applicant has proposed a disk array controller, which can attain a simple arrangement, high-speed processing, and easy control by providing a function of generating parity data using read/write data upon cache memory access to the disk cache means side having a cache memory, in Japanese Patent Application No. 8-234264.

In this disk cache controller, data is distributed and stored on the cache memory premised on RAID3, and a control circuit for the cache memory (cache control means) reads out data from the cache memory and EX-ORs the readout data, thus efficiently generating parity data.

However, when this scheme is applied to RAID5, data and parities before update are widely dispersed in the cache memory, and the cache memory area cannot be efficiently used. The reason for this will be explained below.

In RAID3, since update parity is generated based only on update data upon updating data, all data on the cache memory match those on a disk array (disk drive). For this reason, even when the update data is left on the cache memory, it can be used as read data.

By contrast, in RAID5, data and parity before update must be read out, and EX-ORed with update data upon updating data. For this reason, when the update data, and data and parity before update are allocated on the cache memory by the same method as in RAID3 that generates update parity based only on update data, only the area (⅓ area) of update data on the cache memory is used as that of cache data (read data) (i.e., the area where a copy of data in the disk drive is stored), and the areas of data and parity before update (⅔ area of the cache memory) are wasted.

In this manner, when the same cache control scheme as that for RAID3 is applied to RAID5, data and parities before update, which cannot be used as cache data, are randomly present on the cache memory, and the limited area of the cache memory cannot be efficiently used.

BRIEF SUMMARY OF THE INVENTION

The present invention has been made in consideration of the above situation, and has as its object to provide a disk array controller, which can efficiently generate update parity on the basis of update data, and data and parity before update using a cache memory upon updating data, and can reduce any wasteful area on the cache memory, which cannot be used as cache data, and a cache control method applied to the controller.

It is another object of the present invention to provide a disk array controller, which can efficiently restore original data on the basis of data in the remaining normal disk drives and parity data using a function of generating update parity from update data, and data and parity before update, when a failure has occurred in one of a plurality of disk drives that form a disk array, and a cache control method applied to the controller.

It is still another object of the present invention to provide a disk array controller which can efficiently restore data without being influenced by the number of disk drives (the number of elements) that form a disk array, and a cache control method applied to the controller.

According to the present invention, a disk array controller which comprises external input/output means for controlling input/output with an external host apparatus, disk drive input/output means which allows connection to a disk drive group including N disk drives which form a disk array for storing data input from the host apparatus, disk cache means having a cache memory which temporarily stores transfer data between the disk drives and host apparatus and is managed in units of blocks, and main control means for controlling the respective means, is characterized in that in order to allow generation of parity data on the basis of data before update and parity data before update corresponding to update data upon transferring the update data from the host apparatus, in addition to a first area in which the update data is written, a second area, in which data before update and parity data before update read from one of the N disk drives are temporarily written with a predetermined positional relationship under the control of the main control means, is assured on the cache memory within a predetermined address range, and the disk cache means comprises an EX-OR circuit for EX-ORing two data bit by bit, and cache control means for, when a specific cache access command appended with a request address which indicates a storage location of the update data in the cache memory is supplied from the main control means or disk drive input/output means upon generating parity data in correspondence with the update data transferred from the host apparatus, sequentially reading out the update data at the storage location in the cache memory, which is indicated by the request address, and data before update and parity data before update at storage locations in the second area, which correspond to the storage location of the update data, and making the EX-OR circuit EX-OR the readout data, so as to generate parity data as an EX-OR of the update data, the data before update, and the parity data before update.

Assuming that 2n blocks form the second area, the blocks of the second area are managed in units of n block pairs, and blocks that form the first area are also managed in units of n block columns in correspondence with the n block pairs. An arbitrary disk drive is assigned to each set of one block column in the first area and one block pair in the second area, and update data corresponding to that drive is written in the blocks in the block column. In addition, data before update of that drive and corresponding parity data before update in another drive are written in the block pair corresponding to the block column. In this way, the write locations of the data before update and parity data before update can be easily computed from the write location of the update data. Especially, when a continuous address range is assigned to the block pair, the difference between the addresses of the write locations of the data before update and parity data before update corresponds to one block size, resulting in a very easy computation.

In this arrangement, update parity can be efficiently generated from the update data, data before update, and parity before update using the cache memory upon updating data. In addition, since the data before update and parity data before update, which are not used as cache data, are written in the second area assured on the cache memory in addition to the first area which is used for writing update data, which can be used as cache data, any wasteful area on the cache memory that cannot be used as cache data can be reduced by fixing the second area within a given address range.

According to the present invention, a third area as an extended area of the second area, which is used together with the second area upon restoring data, is assured on the cache memory in addition to the second area. Also, the main control means or disk drive input/output means has parity generation pre-processing means for, when a failure has occurred in one of the N disk drives and data in that disk drive must be restored from data and parity data in the remaining N–1 disk drives, writing data or parity data of each of the remaining N–1 disk drives in the blocks within the first area on the cache memory, and N–2 blocks within the second and third areas, which have a predetermined positional relationship, and command issuance means for sending to the cache control means a cache access command, which is appended with a request address that has a mode designation field set with information for designating a data restoration mode of various modes including a parity generation mode for parity generation and the data restoration mode for data restoration, and indicates the storage location within the first area. In addition, the cache control means has a sequence processing function. With this function, upon receiving a cache access command appended with a request address which includes a mode designation field that designates the data restoration mode, the cache control means sequentially reads out data or parity data from that location within a block in the first area on the cache memory that is indicated by the request address, and makes the EX-OR circuit EX-OR, thereby generating restored data as an EX-OR of the readout N–2 data and one parity data.

Assuming that n×m blocks form the third area, the n×m blocks in the third area are managed in units of n block columns each including m blocks, in correspondence with the n block, pairs in the second area, and a set of one block.column in the first area, one block pair in the second.area,. and one block column in the third area are assigned as a block group for data restoration. Thus, data or parity data in the normal N–1 disk drives of the N disk drives are distributed and written in one block in the block column in the first area, two blocks in the second area, and N–1 blocks of N–4 blocks in the block column in the third area, the write locations in other blocks can be easily calculated from the write location in the block in the first area.

In this arrangement, not only parity generation but also data restoration can be done on a single apparatus (randomly) by changing the value in a given field (mode designation field) of a request address appended to a cache access command which remains the same. In addition, data restoration can be efficiently done in the same procedure as in parity generation by using the function of generating update parity from the update data, data before update, and parity before update. If data used in data restoration written in the first area is replaced by restored data, since that restored data can be used as cache data, high-speed disk access to the restored data can be attained.

According to the present invention, the request address appended to the cache access command has an element number designation field set with the number of elements which represents the number of disk drives that form the disk array, in addition to the mode designation field. When the data restoration mode is designated in the mode designation field, the number N of disk drives that form the current disk array is detected with reference to the element number designation field, and the number of blocks to be read out from the third area, and the number of times of EX-ORing are determined on the basis of the detected number N.

In this arrangement, even when a failure has occurred in disk drives in various disk arrays having different numbers of elements, high-speed data restoration can be achieved. Also, a plurality of disk arrays having different numbers of elements can be used at the same time.

According to the present invention, a disk array controller which comprises external input/output means for controlling input/output with an external host apparatus, disk drive input/output means which allows connection to a disk drive group. that forms a disk array for storing data input from the host apparatus, disk cache means having a cache memory which temporarily stores transfer data between the disk drives and host apparatus and is managed in units of blocks, a standard bus for data transfer to which the external and disk drive input/output means are connected, and main control means for controlling the respective means, is characterized by comprising a plurality of register groups each including three registers which are respectively set with a block address for designating a block in the cache memory where update data transferred from the host apparatus is stored, a block address for, designating a block in the cache memory where data before update read from the disk drive to generate parity data using the update data is stored, and a block address for designating a block in the cache memory where parity data before update is stored, and in that the disk cache means comprises an EX-OR circuit for EX-ORing two data bit by bit, and cache control means for, when a specific cache access command appended with a request address which includes a register designation field for designating one of the plurality of register groups, and an intra-cache address designation field indicating an address in a block of the cache memory is received from the main control means for disk drive input/output means to generate parity data corresponding to the update data transferred from the host apparatus, sequentially reading out update data, data before update, and parity data before update stored at locations designated by the intra-cache address designation field in the request address from blocks in the cache memory indicated by the contents set by the register group which is designated by the register designation field in the request address, and making the EX-OR circuit EX-OR the readout data, so as to generate parity data as an EX-OR of the readout update data, data before update, and parity data before update.

In this arrangement, upon transferring update data from the host apparatus, when that update data is stored at a location within an arbitrary block of the cache memory, the block addresses that designate blocks where data before update and parity data before update corresponding to the update data are stored are set in one of the plurality of register groups. Thus, when the main control means or disk drive input/output means sends a specific cache read command for parity generation to the disk cache means, parity data (update parity) can be generated by sequentially reading out update data, data before update, and parity data before update stored at locations (relative locations in blocks) designated by the intra-cache address designation field of the request address from blocks in the cache memory indicated by the contents set in the register group designated by the register designation command of the request address, and EX-ORing the readout data, and can be output as read data requested by the specific cache read command. When data before update or parity data before update corresponding to the update data is not stored in the cache memory, that data before update or parity data before update can be read from the disk array to an arbitrary block in the cache memory.

As described above, in this arrangement, the cache memory can be used in generating update parity upon transferring update data from the host apparatus, and data before update and parity data before update can be used without being copied on the cache memory, by designating blocks in the cache memory using a register group, update parity can be efficiently generated without any system overhead.

Data generation by means of EX-ORing is done not only when parity data (update parity) is generated from update data, data before update, and parity before update, but also when a failure has occurred in one of the plurality of disk drives which form the disk array and data in that disk drive must be restored. In such case, the number of data used in EX-ORing varies depending on the number of disk drives. In this case, data generated by EX-ORing N data is generally called parity data.

For this purpose, according to the present invention, in order to allow use of the cache memory in generating parity data by EX-ORing a maximum of N data (N is an integer equal to or larger than 4), the controller comprises a plurality of register groups each including N registers, and an element number designation field for designating the number of data used in parity generation is added in the request address. The cache control means generates parity data by selecting predetermined registers, the number of which is designated by the element number designation field in the request address, sequentially reading out data stored at locations designated by the intra-cache address designation field in the request address from blocks in the cache memory indicated by the contents set in the selected registers, and making the EX-OR circuit EX-OR the readout data.

In this arrangement, even when the number of data used in parity generation changes, i.e., when the number of disk drives that form the disk array changes, parity data can be simultaneously generated.

However, in the above arrangement, since the element number designation field must be added in the request address, the number of bits that configure the register designation field decreases by the number of bits of the element number designation field, and the number of registers that can be designated decreases.

Hence, according to the present invention, in order to allow generation of parity data by EX-ORing a maximum of N data without using any element number designation field, a plurality of register groups each of which includes registers, the number of which ranges from 3 (inclusive) to N (inclusive: N is an integer equal to or larger than 4) and is determined by a designation address of a register group, i.e., including various numbers of building registers, are used in place of a plurality of register groups each including N registers. Upon reception of a specific cache read command appended with a request address, which includes a register designation field and intra-cache address designation field, the register group designated by the register designation field in the request address is selected, data stored at locations designated by the intra-cache address designation field in the request address are sequentially read out from blocks in the cache memory, the number of which matches the number of building registers in that register group determined by the value in the register designation field, and which are indicated by the contents set in the registers which form the register group, and the EX-OR circuit is made to EX-OR the readout data, thereby generating parity data.

In this way, since the register designation field in the request address is used not only to designate a register group but also to designate the number of building registers of the register group determined by the value in that designation field, i.e., assigned in advance to the value in that designation field, that is, the number of data used in parity generation, more register groups can be designated by a limited number of bits of the request address, and parity data can be simultaneously generated even when the number of disk drives that form the disk array is freely changed.

According to the present invention, a mode designation field for designating a normal access mode for reading out one data from the cache memory or a parity generation mode for sequentially reading out a plurality of data from the cache memory and generating parity data by EX-ORing the readout data is added in the request address appended to the cache read command. Upon reception of the cache read command, one data in the cache memory designated by the request address or parity data obtained by EX-ORing a plurality of data in the cache memory, is selectively output in accordance with the mode designated by the mode designation field in the request address.

In this arrangement, normal data and parity data obtained by EX-ORing a plurality of data can be easily switched by designation in a specific field (mode designation field) in the request address appended to the cache read command.

If the controller comprises two disk cache means, one disk cache means can read/write data from/to the cache memory while the other disk cache means is generating parity data, thus eliminating cache memory access contention upon parity generation.

When the present invention is applied to a disk array apparatus comprising a plurality of disk arrays, the disk cache means is provided in correspondence with each disk array, thereby preventing other disk arrays from being influenced by the time required for parity generation, and improving the overall system performance. If the number of disk cache means is increased/decreased in correspondence with the relationship between the number of disk arrays and cost, the relationship between system performance and cost can be optimized.

If the building registers of each register group can be written from the standard bus by the main control means, the independence of the disk cache means can be improved. In addition, since the controller is compatible with the standard bus, the present invention can also be applied to versatile systems such as personal computers and the like. In this case, an address space expressed by the address field of the standard bus is partially assigned to the registers, so that these registers can be designated by the address field of the standard bus, i.e., can be seen via the standard bus.

Similarly, if the building registers of each register group can be written from other buses (routes) independent from the standard bus, since the standard bus need not be used to set block addresses in the registers, the use efficiency of the standard bus can be improved, i.e., the system performance can be improved. In this case, the address space used by the main control means can be partially assigned to the registers.

As described in detail above, according to the present invention, since data before update and parity data before update which cannot be used as cache data are written in the second area assured on the cache memory in addition to the first area used for writing update data that can be used as cache data, any wasteful area on the cache memory that cannot be used as cache data can be reduced even when update parity is generated from the update data, data before update, and parity before update using the cache memory upon updating data.

Also, according to the present invention, since the third area as an extended area of the second area, which is used together with the second area upon restoring data, is assured on the cache memory in addition to the second area, data restoration for restoring data from data and parity data in the remaining normal disk drives when a failure has occurred in one of the plurality of disk drives that form the disk array can be efficiently done using the function of generating update parity from the update data, data before update, and parity before update.

Furthermore, according to the present invention, since the element number designation field set with the number of elements indicating the number of disk drives that form the disk array is provided to the request address appended to the cache access command, in addition to the mode designation field, and a sequence process for data restoration is done based on the value in the element number designation field when the data restoration mode is designated by the mode designation field, data restoration can be done at high speed even if a disk drive fails in any of various disk arrays having different numbers of elements.

Moreover, according to the present invention, since the block location in the cache memory where update data is stored upon updating data, and the block locations in the cache memory where data before update and parity before update corresponding to the update data are respectively stored are designated by an arbitrary register group, and parity data is generated by sequentially reading out designated data from blocks in the cache memory indicated by the contents set in the registers designated by the request address appended to a cache read command, and EX-ORing the readout data upon reception of the cache read command for designating parity generation upon updating data, update parity can be efficiently generated from the update data, data before update, and parity before update using the cache memory upon updating data without any system overhead.

In addition, according to the present invention, since the number of data used in EX-ORing (the number of reference data) can be designated by a given field in the request address, even when the number of data used in EX-ORing has changed due to, e.g., a change in the number of disk drives which build the disk array, parity data can be simultaneously generated using the cache memory in correspondence with the number of data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows an example of block segmentation on a cache memory 240 on which a dedicated data/parity before update area 2401 has been assured upon application of RAID5;

DETAILED DESCRIPTION OF THE INVENTION

The preferred embodiments of the present invention will be described hereinafter with reference to the accompanying drawings.

[First Embodiment]

Figure 1:
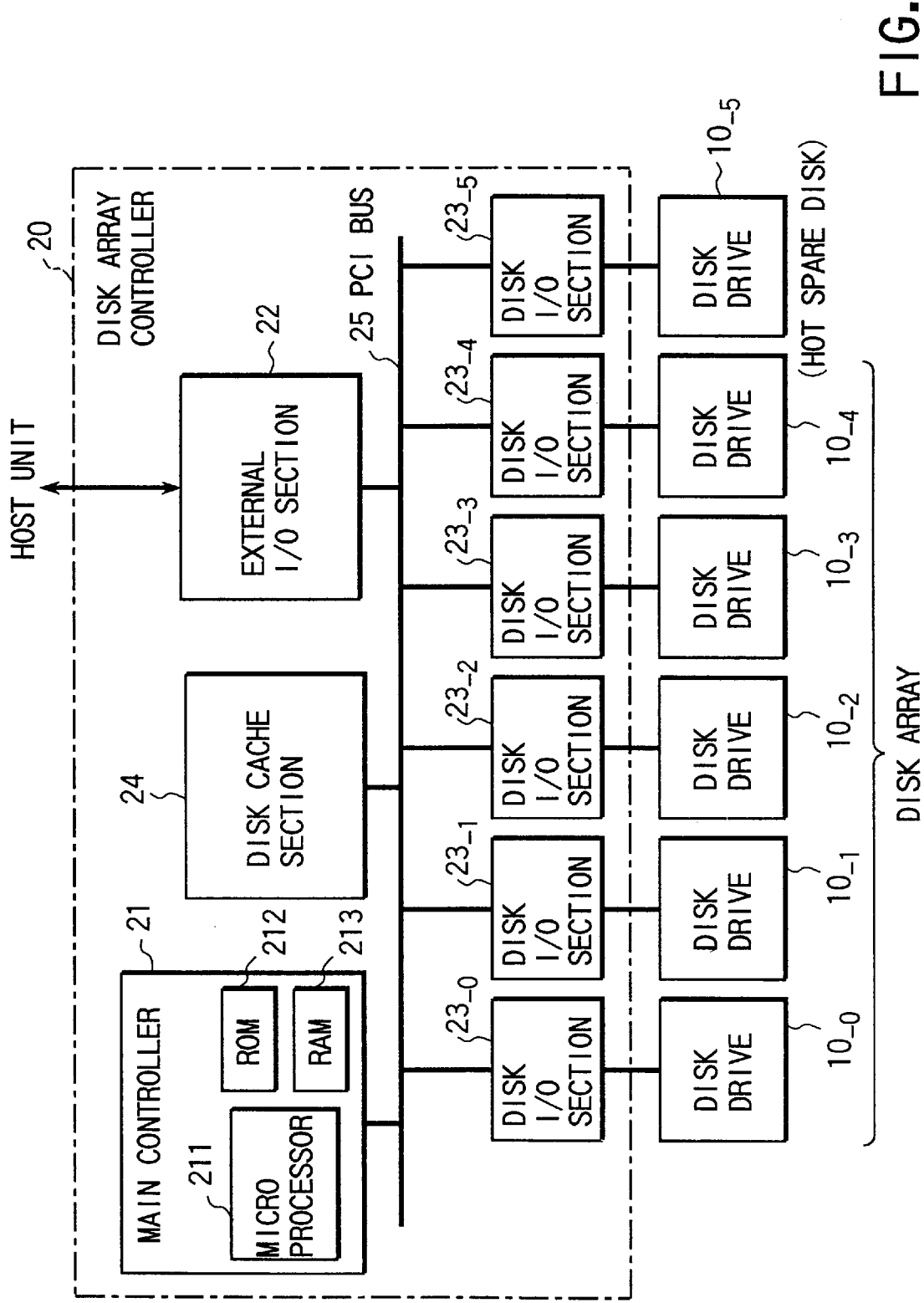
FIG. 1 is a block diagram showing the arrangement of a disk array apparatus which comprise a disk array controller according to the first embodiment of the present invention.

FIG. 1 is a block diagram showing the arrangement of a disk array apparatus comprising a disk array controller according to an embodiment of the present invention.

The disk array apparatus shown in FIG. 1 is constructed by a plurality of, e.g., six, disk drives 10-0 through 10-5, and a disk array controller 20 for controlling access to these disk drives 10-0 through 10-5.

In this embodiment, the disk drives 10-0 through 10-5 are hard disk drives, and one of these drives, e.g., the disk drive 10-5 is assigned to a backup disk (called a hot spare disk). That is, in this embodiment, the five disk drives 10-0 through 10-4 form a disk array.

When the disk array apparatus is used as a RAID3 apparatus, for example, the four disk drives 10-0 through 10-3 are assigned to data disks for storing data, and the disk drive 10-4 is assigned to a parity disk for storing parity data as data correction information. By contrast, when the disk array apparatus is used as a RAID5 apparatus, the disk drives 10-0 through 10-4 are used as data/parity disks for storing data and parity (parity data).

The disk array controller 20 comprises a main controller 21, external I/O section 22, disk I/O sections 23-0 through 23-5, and disk cache section 24. The main controller 21, the external I/O section 22, disk I/O sections 23-0 through 23-5, and disk cache section 24 are interconnected via, e.g., a PCI (Peripheral Component Interconnect) bus 25 known as a standard bus.

The main controller 21 has a microprocessor 211, a ROM 212 which stores a program (control program) for controlling the disk cache section 24, and a RAM 213 used upon execution of that program, and controls data transfer between the external I/O section 22 and disk I/O section 23-0 through 23-5, and the disk cache section 24. The main controller 21 has an interface (not shown: controller interface) for condition-designated programming or the like, and determines an operation circuit (logic) of an FPGA (field programmable gate array; to be described later) via the interface.

The external I/O section 22 is connected to an external host apparatus (not shown), and controls, e.g., the sequence for data transfer with the PCI bus 25. More specifically, the external I/O section 22 makes control for transferring data input from the host apparatus to the disk cache section 24 or the RAM 213 used by the microprocessor 211 (in the main controller 21) via the PCI bus 25, and control for transferring data in the disk cache section 24 or data in the RAM 213 used by the microprocessor 211 to the host apparatus.

The disk I/O sections 23-0 through 23-5 are connected to the disk drives 10-0 through 10-5, and control, e.g., the sequence for data transfer between the PCI bus 25 and the disk drives 10-0 through 10-5. More specifically, the disk I/O sections 23-0 through 23-5 make control for transferring data from the disk drives 10-0 through 10-5 to the disk cache section 24 or the RAM 213 used by the microprocessor 211, and control for transferring data in the disk cache section 24 or data in the RAM 213 used by the microprocessor 211 to the disk drives 10-0 through 10-5.

As shown in detail in FIG. 2, the disk cache section 24 is comprised of a cache memory 240, a FIFO memory 241 serving as a first-in first-out storage means, a PCI bus bridge 242 serving as a bus bridge circuit with the PCI bus 25, a cache controller 243 for controlling the cache memory 240, FIFO memory 241, and the like, and an exclusive sum circuit (to be referred to as an EX-OR hereinafter) 244.

The cache memory 240 temporarily stores transfer data with the host apparatus, and comprises, e.g., DRAMs. In this embodiment, data. transfer between the cache memory 240 and PCI bus.25 is done in units of 32 bytes in accordance with the protocol of the PCI bus 25 in response to a command from the microprocessor 211 (in the main controller 21).

As shown in FIG. 3, the cache memory 240 is segmented into a plurality of blocks, and is managed in units of blocks. FIG. 3 shows a two-dimensional array of blocks for the sake of easy explanation of parity generation in RAID5 (to be described later). In FIG. 3, 16 blocks line up in the horizontal direction, and a plurality of rows of those 16 blocks are stacked in the vertical direction. Each block size is 16 KB (kilobytes).

When RAID5 is applied to the disk array apparatus shown in FIG. 1, an area consisting of a total of 32 blocks (2×16=32) in the first and second rows is assigned as an area 2401 exclusively used for allocating data before update and parity before update (to be referred to as a data/parity before update area hereinafter). The data/parity before update area 2401 is also used for allocating (some of) data in two out of the remaining normal disk drives as restoration data, when a failure has occurred in one of the disk drives 10-0 through 10-4 and data in that disk drive must be restored.

An area consisting of a total of 32 blocks in the third and fourth rows is assigned as an area 2402 exclusively used for allocating (some of) restoration data for a maximum of two disk drives upon restoring data (to be referred to as a restored data area hereinafter). Note that when the disk array is composed of the five disk drives 10-0 through 10-4, as shown in FIG. 1, data restoration uses only the first row in the restored data area 2402.

An area including the fifth row and subsequent rows is assigned as an area 2403 for allocating transfer data (update data) from the host apparatus and transfer data read out from the disk drive 10-i to the host apparatus (to be referred, to as, an update data area hereinafter).

The first row of the data/parity before update area 2401 forms a data before update area 2401a, and the second row forms a parity before update area 2401b. Each of vertical block columns (0 through 15) is assigned to one disk drive 10-i.

The address of the cache memory 240 is indicated by 28 bits. The blocks in the cache memory 240 are assigned addresses (cache addresses) in the order of numerals in circles, as shown in FIG. 3. For example, addresses 0000000h through 0003FFFh for head 16 KB (the last letter "h" represents hexadecimal notation) are assigned to the first-row block in block column 0; addresses 0004000h through 0007FFFh for the next 16 KB, the second-row block in block column 0; addresses 0008000h through 000BFFFh for the next 16 KB, the third-row block in block 0; and addresses 000C000h through 000FFFFh for the next 16 KB, the fourth-row block in block column 0. Addresses 0010000h through 0013FFFh for the next 16 KB are assigned to the first-row block in the next block column 1. Likewise, addresses are assigned to the second- through fourth-row blocks in block column 1, and the first- through fourth-row blocks in block columns 2 through 15.

By contrast, to blocks in the fifth row and subsequent rows, addresses are assigned in turn from the fifth row in the order of from a block at the left end (block column 0) to the one at the right end (block column 15) in that row.

On the other hand, when RAID3 is used, all the blocks in the cache memory 240 are released to allocate transfer data (update data) from the host apparatus and transfer data read out from the disk drive 10-i to the host apparatus. In this case, each block (having a size of 16 KB) is managed while being segmented into four areas in units of 4 KB. The four segmented areas in each block respectively store data to be allocated (or already allocated) in identical areas of the disk drives 10-0 through 10-3.

Referring back to FIG. 2, the FIFO memory 241 temporarily stores data from the cache memory 240 or PCI bus 25, and also temporarily stores parity data generated (by the EX-OR 244) on the basis data from the FIFO memory 241 itself and data from the cache memory 240 or PCI bus 25. The capacity of the FIFO memory 241 matches, e.g., one data transfer size between the cache memory 240 and PCI bus 25, i.e., 32 bytes.

The PCI bus bridge 242 exchanges data with the PCI bus 25, and receives a command from the PCI bus 25. The PCI bus bridge 242 appropriately executes data transfer between the cache memory 240 and PCI bus 25 (in consideration of the direction), data transfer from the cache memory 240 or PCI bus 25 to the FIFO memory 241 or EX-OR 244, transfer from the FIFO memory 241 to the cache memory 240, and transfer from the EX-OR 244 to the PCI bus 25, in accordance with the received command.

The cache controller 243 discriminates one of a normal access mode that accesses the cache memory 240 without any parity generation, a parity generation mode with parity generation, and a data restoration mode for data restoration using parity data, in accordance with a command received by the PCI bus bridge 242, and makes read/write timing control and the like of the cache memory 240 in accordance with the discrimination result. The cache controller 243 reads address information to the cache memory 240 from the received command, and outputs addresses to the cache memory 240.

In this embodiment, the PCI bus bridge 242 and cache controller 243 construct a control means (cache control means) in the disk cache section 24, and are implemented using, e.g., a field programmable gate array (FPGA) 245 as a programmable logic device. The operation circuit of the FPGA 245 is determined by loading (programming) its internal logic from the interface (not shown) of the main controller 21 via a control register (not shown).

The EX-OR 244 generates parity data by EX-ORing data sent from the cache memory 240 or PCI bus bridge 242, and data read out from the FIFO memory 241.

The operation in this embodiment will be described below in the order of normal read/write (normal access) to the cache memory 240, parity generation using the cache memory 240 upon application of RAID5, parity generation using the cache memory 240 upon application of RAID3, data restoration using the cache memory 240, and variable setups of the number of disk array building elements.

(1) Normal Read/write to Cache Memory

When the microprocessor 211 in the main controller 21 requires some read/write access to the cache memory 240 in the disk cache section 24, it outputs a cache access command (cache read/write command) indicating it to the PCI bus bridge 242 in the disk cache section 24 via the PCI bus 25. This command is appended with, e.g., 32-bit address information (to be referred to a request address hereinafter).

In this embodiment, the range from, e.g., 00000000h through 00010000h in an address space indicated by the 32-bit request address is assigned to those for a firmware (F/W) program, and the ranges from 10000000h through 1FFFFFFFh, 20000000h through 2FFFFFFFh, and 30000000h through 3FFFFFFFh are assigned to those for the cache memory 240.

Note that the address (cache address) of the cache memory 240 is indicated by the lower 28 bits of 10000000h through 1FFFFFFFh, 20000000h through 2FFFFFFFh, and 30000000h through 3FFFFFFFh. Hence, when the main controller 21 outputs a cache access command to the PCI bus bridge 242, the lower 28 bits of the 32-bit request address appended to that command indicate the start cache memory address of target data (32 bytes).

The upper 4-bit value of the 32-bit request address indicates if the corresponding cache access command is a normal access command indicative of the normal access mode for making normal read/write access to the cache memory 240, a parity generation command indicative of the parity generation mode for generating parity data using the cache memory 240 (i.e., making data read from the cache memory 240 and using that read data), or a data restoration command indicative of the data restoration mode for restoring data in the disk drive 10-i (i=0 through 4) using the cache memory 240 (i.e., making data read from the cache memory 240 and using that read data). In this case, "0001" (1h) indicates the normal access mode; "0010" (2h), the parity generation mode; and "0011" (3h), the data restoration mode. That is, the upper 4 bits of the request address form a mode (scheme) designation field of cache access.

Upon receiving a command from the main controller 21 via the PCI bus 25, the PCI bus bridge 242 determines the data flow direction from that command, and sends the received command to the cache controller 243.

Upon receiving the command from the PCI bus bridge 242, the cache controller 243 refers to the upper 4 bits of the request address appended to that command. If the upper 4-bit value is "0001" (1h), the controller 243 determines the normal access mode (normal access command); if it is "0010" (2h), the parity generation mode (parity generation command); if it is "0011" (3h), the data restoration mode (data restoration command).

Assuming that the request address is "1xxxxxxxxh" (x is one of 0h through Fh), and the normal access mode is designated, the cache controller 243 executes cache read/write control in the normal access mode as follows.

The cache controller 243 determines the data flow direction in accordance with the command received from the PCI bus bridge 242, outputs and sets a cache memory address (start cache memory address) obtained from the request address (lower 28 bits thereof) appended to that command to the cache memory 240, and generates and outputs a control signal for read/write to the cache memory 240. When a plurality of data (data corresponding to multiples of 32 bytes in this case) are continuously transferred, the address is incremented by 32 bytes every time one data (32-byte data) is read/written.

Then, data read/write to a 32-byte area of the cache memory 240 indicated by the designated cache memory address is made.

The operation when the upper 4 bits of the request address appended to the command from (the microprocessor 211 in) the main controller 21 are "0001" (1h), i.e., when the command from the main controller 21 instructs normal access to the cache memory 240, has been explained.

This command instructing normal access is used (a) when data on the disk drive 10-i requested from the host apparatus is read out from the cache memory 240 upon cache hit, i.e., if that requested data is also present on the cache memory 240, (b) when the requested data is written in the cache memory 240 upon cache misshit, i.e., if that requested data read out from the disk drive 10-i is not present on the cache memory 240, (c) when update data requested from the host apparatus is also written in the cache memory 240 upon writing that update data in the disk drive 10-i, (d) when data before update and parity (parity data) before update corresponding to the update data are written in the cache memory 240 in addition to the update data upon updating data in RAID5, and so forth.

Note that in case of (d) the write addresses of data before update and parity before, update in the cache memory 240 are uniquely determined from the write address of the update data in the cache memory 240 in accordance with a predetermined formula. This will be explained later in the paragraphs of parity generation upon application of RAID5.

(2) Parity Generation Upon Application of RAID5

Figure 4:
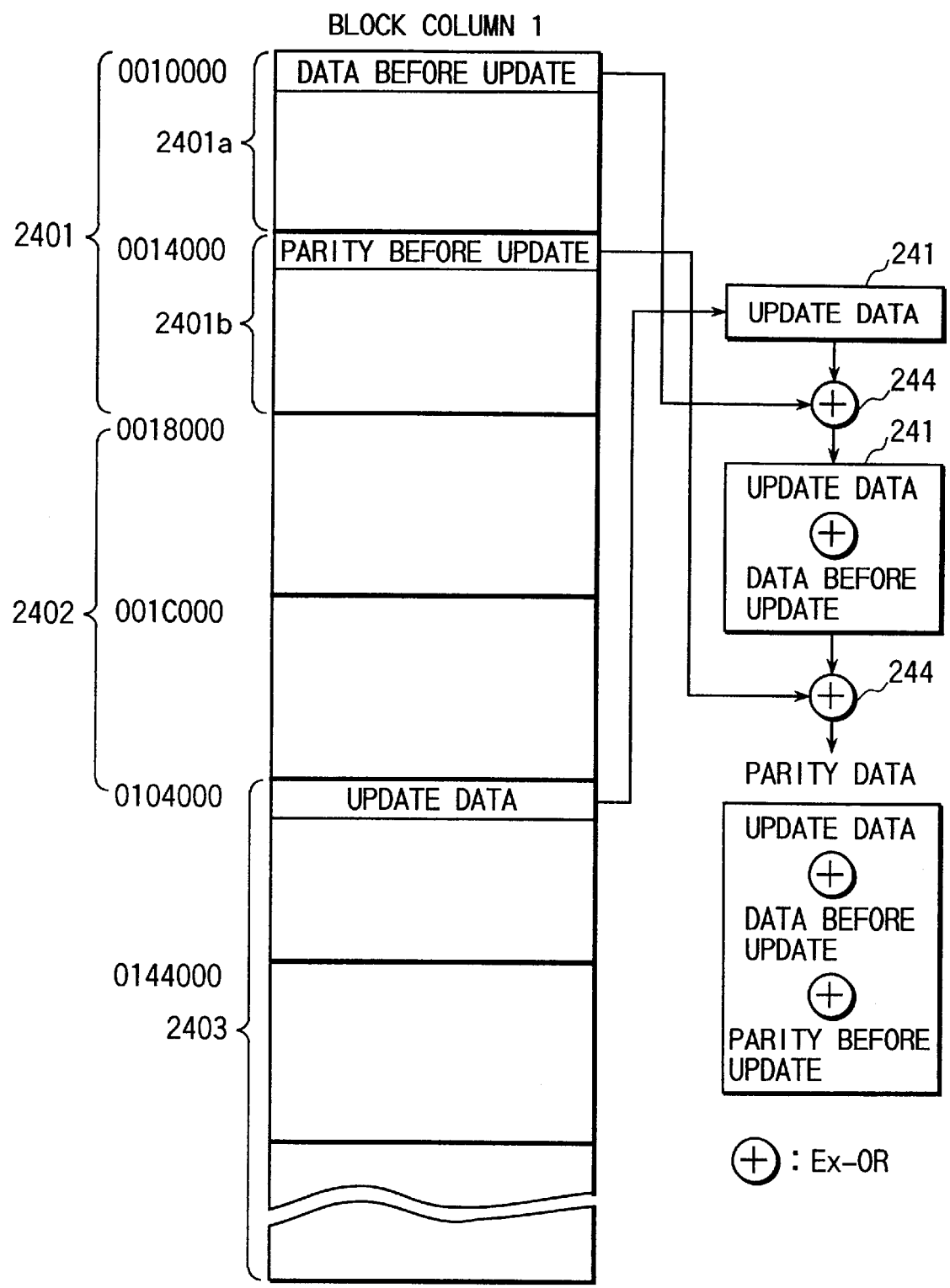
FIG. 4 is a view for explaining the sequence of parity generation upon application of RAID5.

Parity generation upon application of RAID5 will be explained below with reference to FIGS. 4 and 5.

Upon receiving an update request of data on the disk drive 10-i (i=0 through 4) from the host apparatus, the microprocessor 211 in the main controller 21 sends a command (cache write command) instructing normal access to the cache controller 243 in the disk cache section 24, and controls the cache controller 243 to write update data from the host apparatus in the update data area 2403 in the cache memory 240.

Also, the microprocessor 211 sends a command (cache write command) instructing normal access to the cache controller 243 and controls the cache controller 243 to write data before update on the disk drive 10-i corresponding to the update data from the host apparatus, and parity before update on another disk drive 10-j (j=0 through 4; for j≠i) corresponding to the update data in the data before update area 2401a and parity before update area 2401b corresponding to the write location of the update data in the cache memory 240.

More specifically, the microprocessor 211 controls the cache controller 243 to write the update data in a block in the fifth or subsequent row (update data area 2403) in block column k (k=0 through 15) on the cache memory 240 shown in FIG. 3, and to write data before update and parity before update in the first-row block (data before update area 2401a) and the second-row block (parity before update area 2401b) in block column k. The locations (relative locations) in the blocks where the data before update and parity before update are written match the location in the block where the update data is written.

Assume that in this way update data has been written in an area starting from the start location (address "0104000h" of cache memory 240) of the fifth-row block in block column 1, data before update has been written in an area starting from the start location (address "0010000h" of the cache memory 240) of the first-row block in block column 1, and parity before update has been written in an area starting from the start location (address "0014000h" of the cache memory 240) of the second-row block in block column 1.

After the microprocessor 211 makes the cache controller 243 write the update data in the update data area 2403 of the cache memory 240, the data before update in the data before update 2401a, and the parity before update in the parity before update area 2401b using the command instructing normal access, it outputs a special cache read command (parity generation command) instructing parity data generation to the PCI bus bridge 242 in the disk cache section 24 via the PCI bus 25.

The parity generation command sent from the microprocessor 211 is appended with a 32-bit request address. The upper 4 bits of this request address are "0010" (2h) indicating the parity generation mode. Also, the lower 28 bits of the request address indicate the address (cache memory address) of the cache memory 240. When the upper 4 bits are "0010" (2h) (i.e., parity generation mode) like in this example, the lower 28 bits of the request address indicate storage (allocation) location of update data in the cache memory 240. In this example, assume that the lower 28 bits are "0104000h". In the parity generation mode, parity data (update data) is generated by sequentially reading out update data designated by the lower 28 bits (cache memory address) of the request address, and data before update and parity before update corresponding to the update data from the cache memory 240 on the basis of the lower 28 bits, and EX-ORing the readout data.

Upon receiving the command from the microprocessor 211 in the main controller 21 via the PCI bus 25, the PCI bus bridge 242 determines the data flow direction from that command, and sends the command to the cache controller 243.

Upon receiving the command from the PCI bus bridge 242, the cache controller 243 refers to the upper 4 bits of the request address appended to the command. When the upper 4 bits are "0010" (2h) like in this example, the controller 243 determines the parity generation mode (parity generation command), and executes a sequence process for parity generation as follows.

Figure 5:
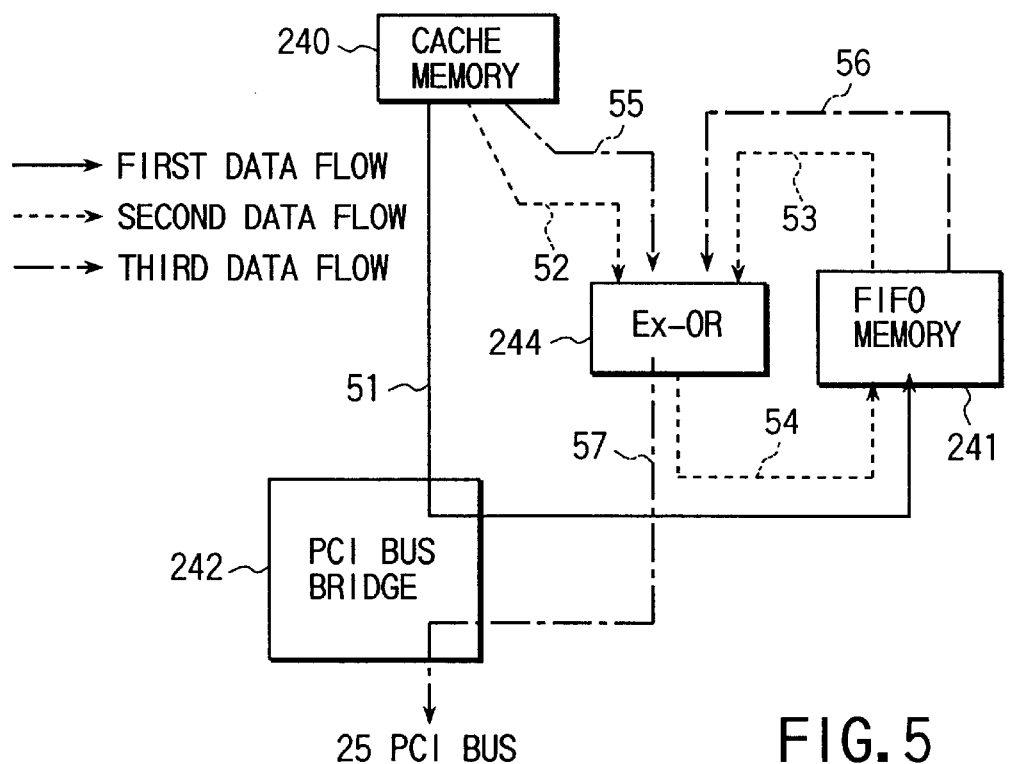
FIG. 5 is a diagram for explaining the data flow upon parity generation shown in FIG. 4.

In the parity generation mode, the cache controller 243 sets the lower 28 bits ("0104000h" in this example) of the request address appended to the received command as an address (update data address) of the cache memory 240, generates and outputs a control signal for data read from the memory 240 so as to read out 32-byte update data, and- .writes the readout data in the FIFO memory 241 via the PCI bus bridge 242, as indicated by an arrow 51 in FIG. 5.

Upon completion of update data read, the cache controller 243 generates a cache memory address (data before update address) for reading out data before update on the basis of the update data address in accordance with a predetermined formula.

In this embodiment, the data before update address is calculated by:

Data before update address=((update data address AND 003C00$h$)×4) OR (update data address AND 0003FFF$h$)     (1)

The term ((update data address AND 003C00h)×4) in equation (1) calculates the cache memory address at the start location of a block where data before update corresponding to the update data designated by the update data address is allocated. Also, the term (update data address AND 0003FFFh) in equation (1) calculates the allocation location (address in a block) of the data before update in that block. In this case, since the update data address is "0104000h", the data before update address "0010000" is obtained.

After the data before update address ("0010000") is obtained according to equation (1) above, the cache controller 243 sets that address in the cache memory 240, and generates and outputs a control signal for data read from the memory 240 so as to read out 32-byte data before update from the memory 240 toward the EX-OR 244, as indicated by an arrow 52 in FIG. 5.

At the same time, the cache controller 243 reads out update data previously written in the FIFO memory 241 toward the EX-OR 244, as indicated by an arrow 53 in FIG. 5.

The EX-OR 244 EX-ORs the update data read out from the FIFO memory 241 and the data before update read out from the cache memory 240 bit by bit. The (32-byte) EX-OR output from the EX-OR 244 is written in the FIFO memory 241 under the control of the cache controller 243, as indicated by an arrow 54 in FIG. 5.

The cache controller 243 then generates a cache memory address (parity before update address) for reading out parity before update on the basis of the data before update address in accordance with a predetermined formula, upon completion of read of the data before update.

In this embodiment, the parity before update address is calculated by:

Parity before update address=data before update address+ 0004000$h$     (2)

That is, the parity before update address is obtained by advancing the data before update address by one block size (16 KB). In this example, since the data before update address is "0010000h", the parity before update address "0014000" is obtained.

After the parity before update address ("0010000h") is obtained according to equation (2) above, the cache controller 243 sets that address in the cache memory 240, and generates and outputs a control signal for data read from the memory 240, thereby reading out 32-byte parity before update from the memory 240 toward the EX-OR 244, as indicated by an arrow 55 in FIG. 5.

At the same time, the cache controller 243 reads out the EX-OR (of the update data and the data before update) previously written in the FIFO memory 241 toward the EX-OR 244, as indicated by an arrow 56 in FIG. 5.

The EX-OR 244 EX-ORs the previous EX-OR (of the update data and the data before update) read out from the FIFO memory 241, and the parity before update read out from the cache memory 240 bit by bit. The (32-byte) EX-OR output from the EX-OR 244 serves as update parity (update parity data), and is output from the PCI bus bridge 242 onto the PCI bus 25, as indicated by an arrow 57 in FIG. 5.

As described above, in this embodiment, when the microprocessor 211 in the main controller 21 issues only a parity generation command to the disk cache section 24, update data designated by the lower 28 bits (cache memory address) of a request address appended to that command, and data before update and parity before update corresponding to that update data are sequentially read out from the cache memory 240 under the control of the cache controller 243 in the disk cache section 24, and are EX-ORed by the EX-OR 244, thereby automatically generating update parity designated by that command, and outputting the update parity onto the PCI bus 25. Put, otherwise, the microprocessor 211 in the main controller 21 need only issue a parity generation command (cache read command that designates the parity generation mode) to the disk cache section 24 to read update parity corresponding to the update data designated by that command.

The update parity which is generated according to the parity generation command output from the microprocessor 211 in the main controller 21 and is read out onto the PCI bus 25 is sent to the disk I/O section 23-j corresponding to the disk drive 10-j where the parity before update were stored, under the control of the microprocessor 211. The disk I/O section 23-j stores the update parities in an area of the disk drive 10-j where old parities (parities before update) were stored every time the update parities output from the PCI bus bridge 242 in the disk cache section 24 have reached, e.g., one sector.

The microprocessor 211 in the main controller 21 outputs a parity generation command having a request address, which has been incremented by 32 bytes from that in the previous parity generation command, to the disk cache section 24. In response to this command, the next 32-byte update data, and data before update and parity before update corresponding to that data are sequentially read out from the cache memory 240 under the control of the cache controller 243 in the disk cache section 24, and are EX-ORed, thereby generating the next 32-byte update parity, and outputting that parity onto the PCI bus 25.

In this fashion, by repeating operation for generating update parity by sequentially reading out update data, data before update, and parity before update on the cache memory 240 in units of 32 bytes (given data size unit) and EX-ORing the readout data, update parities corresponding to all update data requested from the host apparatus can be generated.

When new update data is transferred from the host apparatus while parity is being generated using the update data area 2403, data before update area 2401a, and parity before update area 2401b in block column k (k=1 in the above example), the update data area 2403, data before update area 2401a, and parity before update area 2401b in a block column other than block column k can be used.

(3) Parity Generation Upon Application of RAID3

Parity generation upon application of RAID3 will be briefly explained below.

In RAID3, update data transferred from the host apparatus is segmented into A0, B0, C0, D0, A1, B1, C1, D1, . . . in units of sectors (one sector=512 bytes in this case), and the segmented data are written in four 4 KB areas in an identical block of the cache memory 240 in the order of [a01, b01, c01, d01], [a02, b02, c02, d02], . . . , [a11, b11, c11, d11], [a12, b12, c12, d12], . . . in units of 32 bytes every four sectors. Also, [A0, B0, C0, D0], [A1, B1, C1, D1], . . . are written in the disk drives 10-0, 10-1, 10-2, and 10-3. Note that the locations in the 4 KB areas of update data aij, bij, cij, and dij written in the four 4 KB areas in one block match each other.

Hence, in order to generate update parity pij from update data aij, bij, cij, and dij written in the four 4 KB areas in one block, operation for reading out update data aij, bij, cij, and dij from those four 4 KB areas in units of 32 bytes can be executed while switching the 4 KB area of interest.

Figure 6:
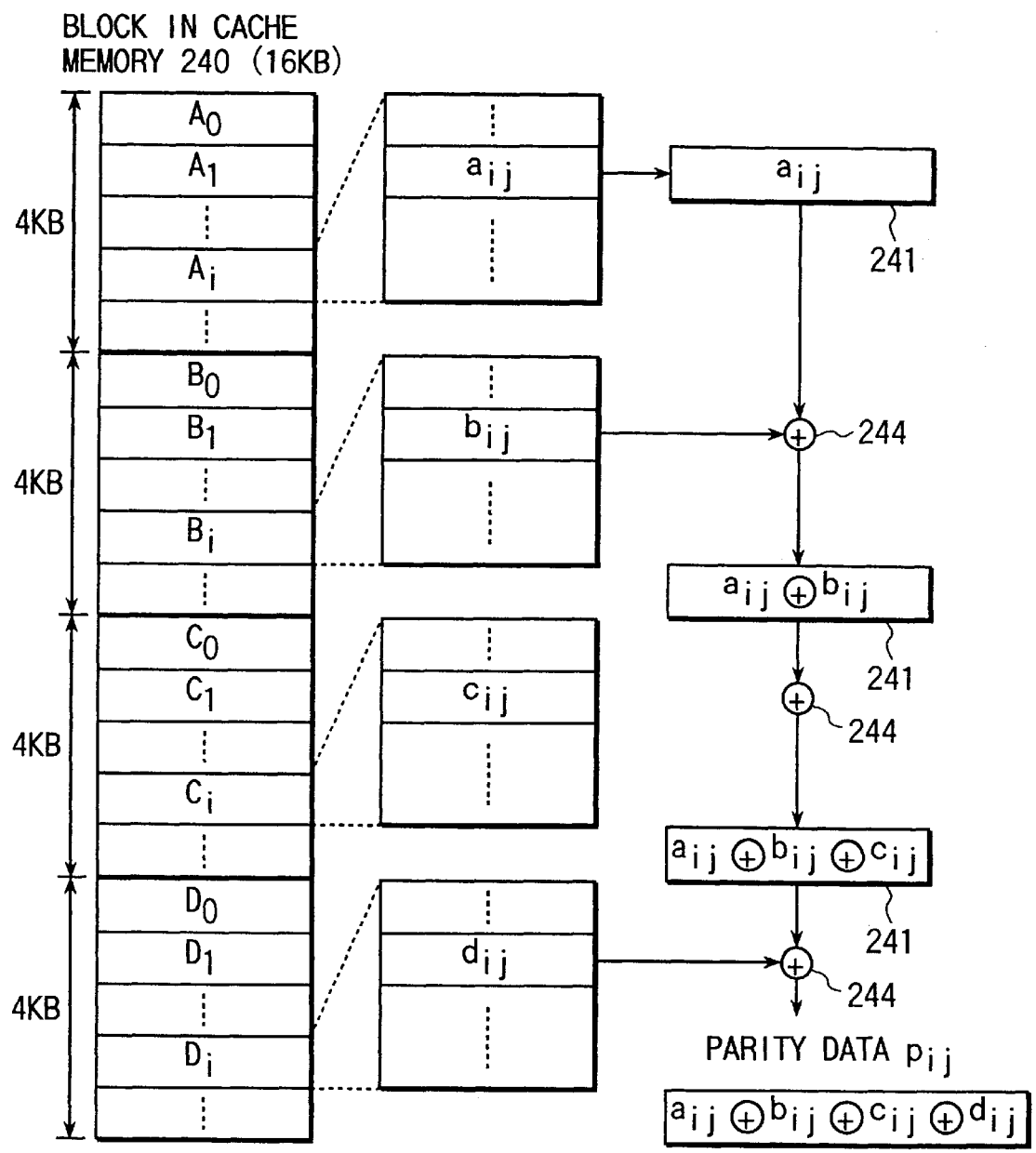
FIG. 6 is a view for explaining the sequence of parity generation upon application of RAID3.

More specifically, as shown in FIG. 6, update data aij is read out from the first 4 KB area in a block in the cache memory 240, and is written in the FIFO memory 241.

The cache memory address is advanced by 4 KB to read out update data bij from the second 4 KB area in the block in the cache memory 240, and update data aij from the FIFO memory 241 toward the EX-OR 244. Then, the readout data are EX-ORed, and the obtained EX-OR is written in the FIFO memory 241.

Also, the cache memory address is advanced by 4 KB to read out update data cij from the third 4 KB area in the block in the cache memory 240, and the EX-OR of update data aij and bij from the FIFO memory 241 toward the EX-OR 244. Then, the readout data are EX-ORed, and the EX-OR is written in the FIFO memory 241.

Furthermore, the cache memory address is advanced by 4 KB to read out update data dij from the fourth 4 KB area in the block in the cache memory 240, and the EX-OR of update data aij, bij, and cij from the FIFO memory 241 toward the EX-OR 244. Then, the readout data are EX-ORed. The obtained EX-OR is output as update parity pij for update data aij, bij, cij, and dij onto the PCI bus 25 via the PCI bus bridge 242. Every time update parities pij have reached, e.g., one sector, the update parities for one sector are stored in an area of the disk drive 10-4 where parities before update are stored. By repeating the same process for the subsequent update data, corresponding update parity can be acquired. Note that the cache memory address of 32-byte data ai+1j can be obtained by advancing the cache memory address of data aij.

(4) Data Restoration Upon Application of RAID5

Data restoration upon application of RAID5 will be explained below.

In RAID5, when a failure has occurred in one of the disk drives that form the disk array, original data must be restored by sequentially EX-ORing data in the remaining normal disk drives, and must be stored in (the disk drive serving as) the hot spare disk.

The following problem is posed when data restoration upon application of RAID5 is automatically done using the aforementioned update parity generation function using the cache memory in the parity generation mode, i.e., using the function of sequentially reading out three data, i.e., update data, data before update, and parity before update stored in the cache memory by designating a single command, and EX-ORing the readout data in the disk cache section 24.

Figure 7A:
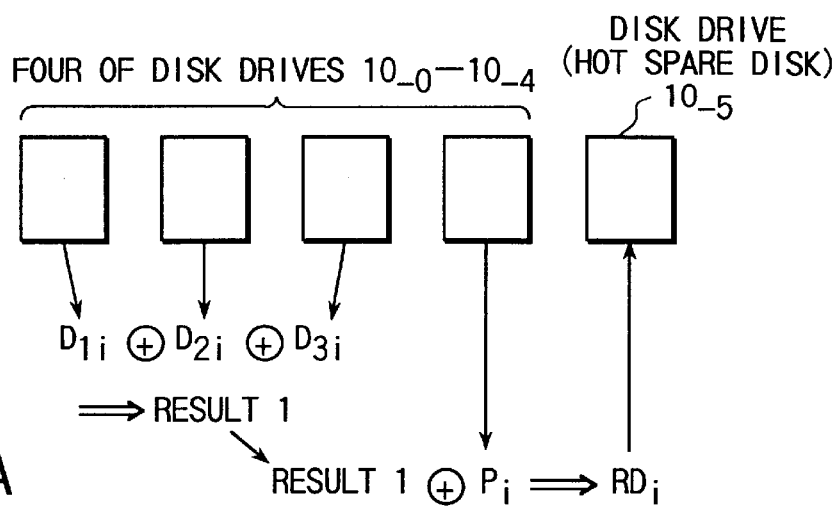
FIGS. 7A and 7B are views for explaining the principle of data restoration using the parity generation function upon application of RAID5, and the improved principle of data restoration.

In this embodiment, the disk array is comprised of the five disk drives 10-0 through 10-4. Hence, when a failure has occurred in one of these disk drives, original data can be restored by EX-ORing data (four data, i.e., data D1i, data D2i, data D3i, and parity Pi) in the four remaining normal disk drives. However, since the update parity generation function can only EX-OR three data, an operation sequence corresponding to update parity generation must be done twice, as shown in FIG. 7A, so as to generate restored data RDi of the disk drive that has caused the failure from the four data D1i, D2i, D3i, and Pi.

Figure 7B:
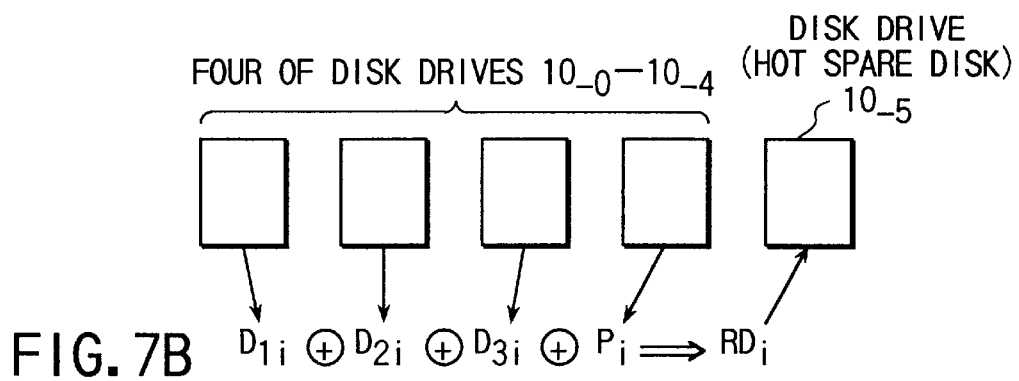

To solve this problem, according to this embodiment, as shown in FIG. 7B, a cache read command (data restoration command) is prepared. This command instructs a data restoration mode which can sequentially read out four data D1i, D2i, D3i, and Pi from the cache memory and EX-OR the readout data to generate restored data RDi in an operation sequence. As has already described earlier, the data restoration mode can be instructed by setting the upper 4 bits of the request address appended to the command at "0011" (3h). That is, the data restoration mode and parity generation mode are distinguished from each other by only the upper 4-bit value of the request address appended to the cache read command, and both data restoration and parity generation can be implemented by the disk cache section 24 alone.

Upon application of RAID5, when a failure has occurred in one of the disk drives (data/parity disks) 10-0 through 10-4, e.g., the disk drive 10-4, data must be restored in the disk drive (hot spare disk) 10-5 using data in other disk drives 10-0 through 10-3.

In this case, the microprocessor 211 in the main controller 21 writes parity data Pi in the disk drives 10-0 through 10-3 in a block in the fifth or subsequent row (update data area 2403) in block column k on the cache memory 240, and corresponding data D1i, D2i, and D3i in the disk drives 10-0 through 10-3 in blocks in the first through third rows (two blocks in the data/parity before update area 2401 and the first block in the restored data area 2402) for one block in units of 32 bytes. This write is implemented by sending a command (cache write command) that instructs normal access from the microprocessor 211 to the cache controller 243 in the disk cache section 24.

Subsequently, the microprocessor 211 outputs a special cache read command that instructs data restoration, i.e., a cache read command (data restoration command) having a request address, the upper 4 bits of which are "0011" (3h), to the PCI bus bridge 242 in the disk cache section 24 via the PCI bus 25. The lower 28 bits of this request address indicate the storage location of the parity data written in the block in the fifth or subsequent row (update data area 2403) in block column k on the cache memory 240.

Upon receiving the command from the microprocessor 211 via the PCI bus 25, the PCI bus bridge 242 determines the data flow direction from that command, and sends the command to the cache controller 243.

Upon reception of the command from the PCI bus bridge 242, the cache controller 243 refers to the upper 4 bits of the request address appended to that command. When the upper 4 bits are "0011" (3h) as in this example, the cache controller 243 determines the data restoration mode (data restoration command), and executes a sequence process for data restoration shown in FIG. 8 in the same manner as in the parity generation mode. However, unlike the parity generation mode, the number of data reads from the cache memory 240 increases by one, and the number of data writes in the FIFO memory 241 and the number of computations in the EX-OR 244 increase by one accordingly.

Figure 8:
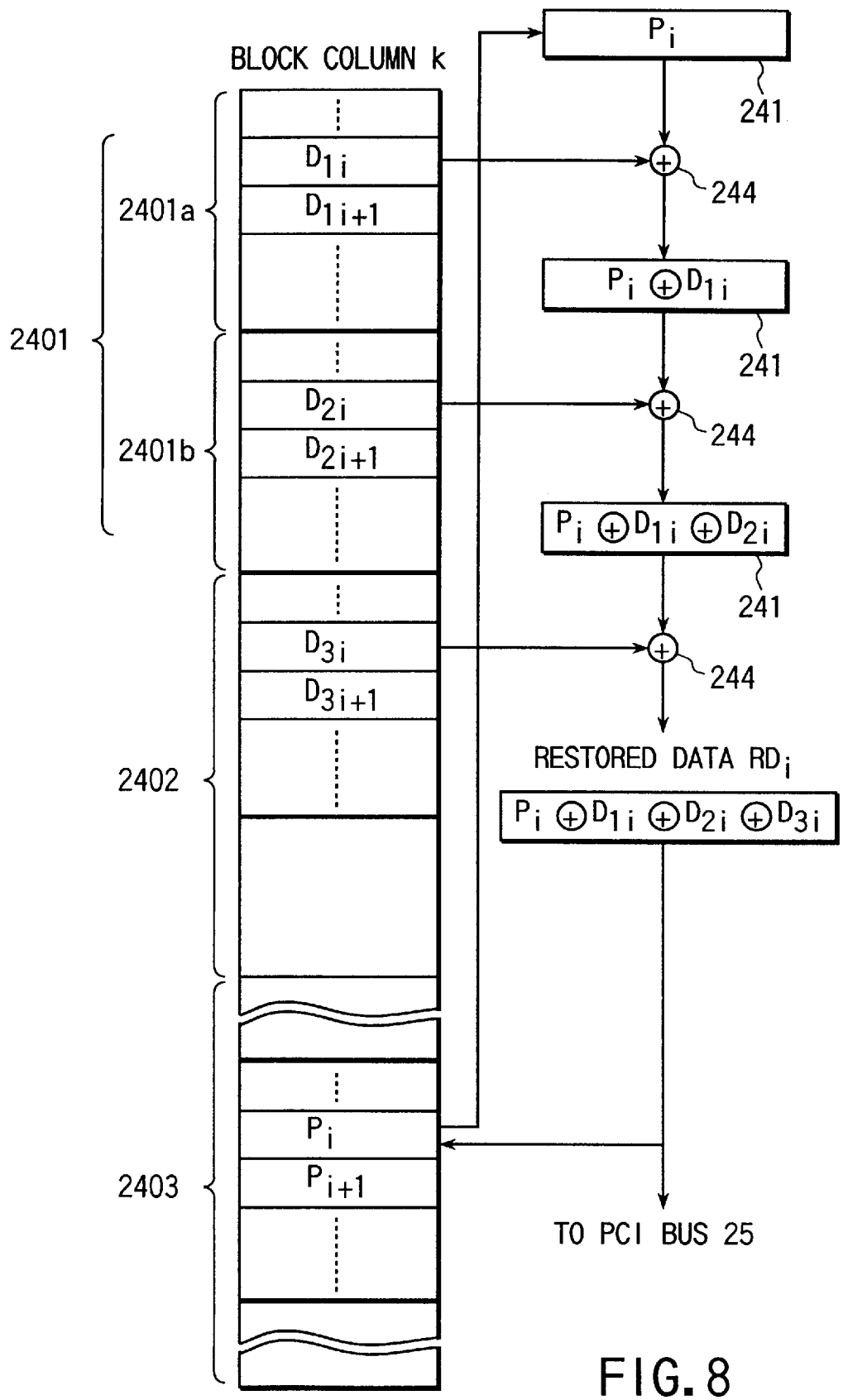
FIG. 8 is a view for explaining the sequence of improved data restoration when five disk drives (the number of elements) form a disk array.

More specifically, the cache controller 243 reads out the parity data Pi (32 bytes) from the block in the update data area 2403 on the cache memory 240 on the basis of the cache address (to be referred to as a parity address hereinafter) indicated by the lower 28 bits of the request address, and writes the readout data in the FIFO memory 241 via the PCI bus bridge 242, as shown in FIG. 8.

The cache controller 243 obtains the address (first data address) of the data D1i written in the first-row block (block in the data before update area 2401a) in block column k on the cache memory 240 from the parity data address by the same computation as that of equation (1) above, and reads out the data D1i from the cache memory 240 toward the EX-OR 244 using the obtained address. At the same time, the cache controller 243 reads out the parity data Pi previously written in the FIFO memory 241 toward the EX-OR 244.

The EX-OR 244 EX-ORs the parity data Pi read out from the FIFO memory 241 and the data D1i read out from the cache memory 240 bit by bit. The (32-byte) EX-OR output from the EX-OR 244. is written in the FIFO memory 241.

The cache controller 243 then obtains the address (second data address) of the data D2i, which is advanced by one block size (16 KB) from the first data address, i.e., the address of the data D2i written in the second-row block (block. in the parity before update area 2401b) in block column k, by the same computation as that of equation (2) above, and reads out the data D2i from the cache memory 240 toward the EX-OR 244 using the obtained address. At the same time, the cache controller 243 reads out the EX-OR of Pi and D1i previously written in the FIFO memory 241 toward the EX-OR 244.

The EX-OR 244 EX-ORs the EX-OR of Pi and D1i read out from the FIFO memory 241, and D2i read out from the cache memory 240. The EX-OR output from the EX-OR 244 is written in the FIFO memory 241.

The cache controller 243 obtains the address (third data address) of the data D3i, which is advanced by one block size (16 KB) from the second data address, i.e., the address of the data D3i written in the third-row block (first block in the restored data area 2402) in block column k, by the same computation as that of equation (2) above, and reads out the data D3i from the cache memory 240 toward the EX-OR 244 using the obtained address. At the same time, the cache controller 243 reads out the EX-OR of Pi, D1i, and D2i previously written in the FIFO memory 241 toward the EX-OR 244.

The EX-OR 244 EX-ORs the EX-OR of Pi, D1i, and D2i read out from the FIFO memory 241, and the data D3i read out from the cache memory 240. The EX-OR output from the EX-OR 244 serves as restored data RDi, and is supplied to the cache memory 240 via the PCI bus bridge 242 under the control of the cache controller 243. The restored data RDi is written at the location in the update data area 2403 where the parity data Pi was stored. That is, the parity data Pi is replaced by the restored data RDi.

At the same time, the restored data RDi is output from the PCI bus bridge 242 onto the PCI bus 25. The data RDi is sent to the disk I/O section 23-5 under the control of the microprocessor 211, and is stored in the disk drive (hot spare disk) 10-5 by the disk I/O section 23-5.

The microprocessor 211 in the main controller 21 sends a data restoration command having a request address, which has been incremented by 32 bytes from that of the previous data restoration command, to the disk cache section 24. In response to this command, under the control of the cache controller 243 in the disk cache section 24, the next 32-byte parity data Pi+1, and data D1i+1, D2i+1, and D3i+1 are sequentially read out from the cache memory 240, and are EX-ORed to generate the next 32-byte restored data RDi+1. The parity data Pi+1 in the cache memory 240 is replaced by the generated restored data RDi+1, which is also output onto the PCI bus 25.

By repeating the aforementioned operations, data in the failed disk drive 10-4 can be restored on the disk drive (hot spare disk) 10-5 by one block, and can be allocated on the cache memory 240 (the update data area 2403 thereof). Upon repeating such restoration for the entire area of the disk, data in the disk drive 10-4 can be restored on the disk drive (hot spare disk) 10-5. When data of subsequent blocks are written in other block column from the disk drives 10-0 through 10-3 in another block column while the aforementioned operation is done for block k, high-speed data restoration can be attained.

(5) Variable Setup of the Number of Disk Array Building Elements

In data restoration described in (4), by designating the data restoration mode (that upon application of RAID5) using the upper 4 bits of the request address, data corresponding in number to the number of building disk drives in the disk array (the number of elements−1 (i.e., the data and parity data in the normal disks in the disk array) can be EX-ORed while being distinguished from the parity generation mode that EX-ORs three data.

However, this scheme can be applied to only the system in which the number of building elements of the disk array is 5, but cannot be applied to a system having other numbers of building elements.

An embodiment capable of data restoration in a disk array having an arbitrary number of elements will be explained below.

Figure 9:
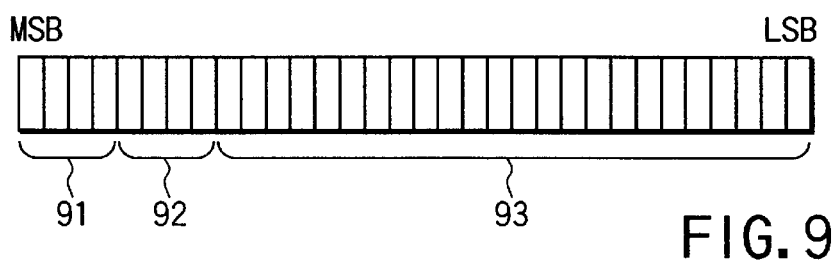
FIG. 9 shows an example of the format of a request address which allows data restoration in various disk arrays having different numbers of elements.
Figure 10:
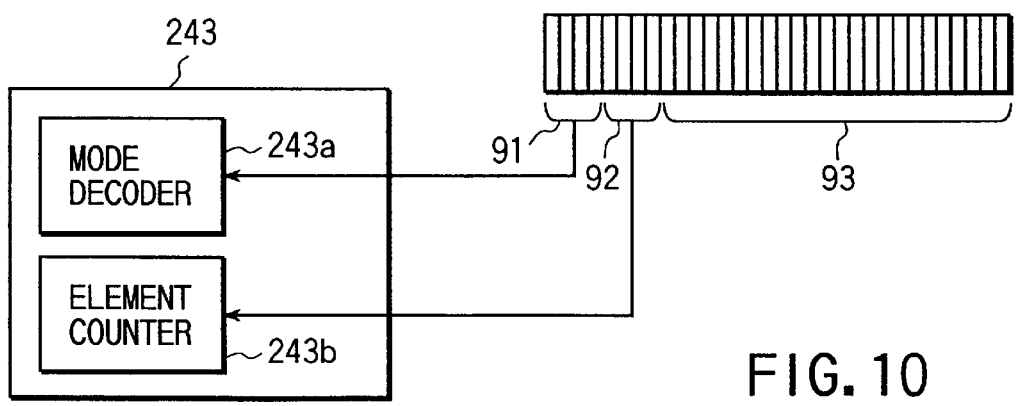
FIG. 10 is a block diagram showing the arrangement of a main portion of a cache controller 243 when the request address format shown in FIG. 9 is applied.

In this embodiment, as shown in FIG. 9, in addition to a mode (scheme) designation field 91 assigned to the upper 4 bits of the request address appended to the cache access command (cache read command) as in the above embodiment, an element number designation field 92 is assigned to the next 4 bits, and the remaining bits are used as a cache address designation field 93.

Figure 2:
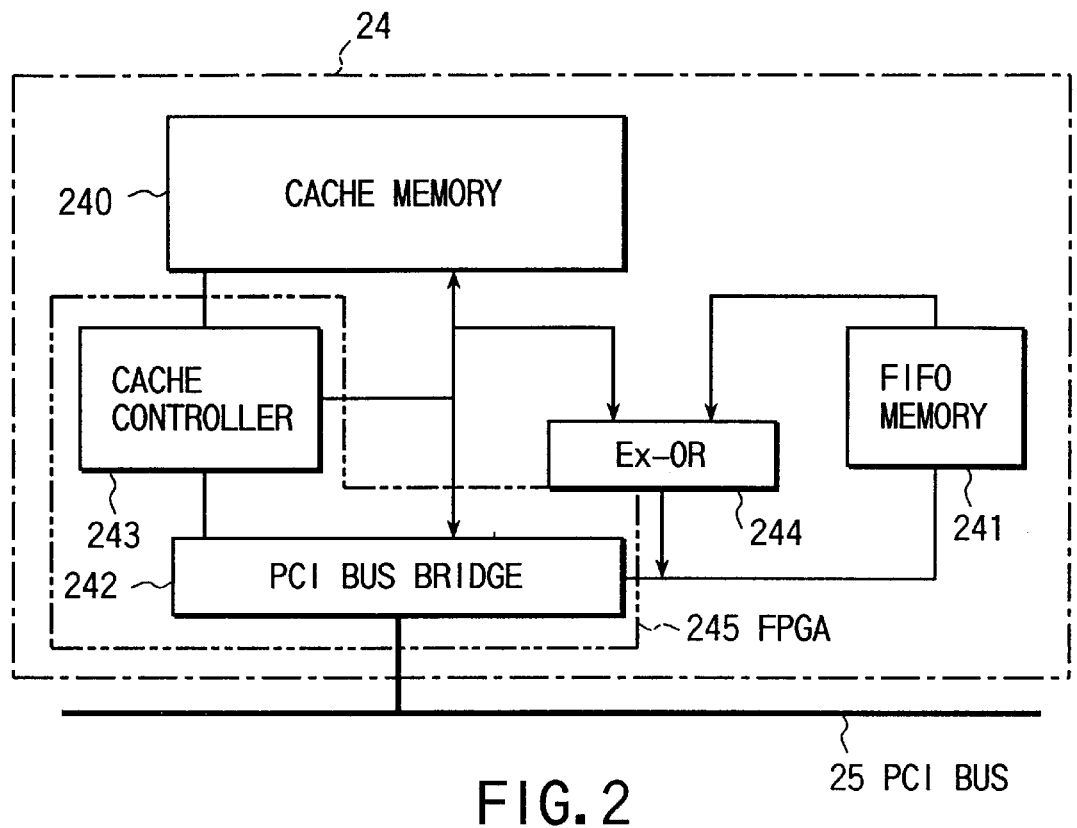
FIG. 2 is a block diagram showing the arrangement of a disk cache section 24 in FIG. 1.

Also, the cache controller 243 shown in FIG. 2 is provided with a mode decoder 243a for decoding a cache access mode from the mode designation field 91 of the request address, and an element counter 243b in which a value obtained by subtracting 1 from the value set in the element number designation field 92 of the request address is set in correspondence with the mode decoding result of the mode decoder 243a.

In this arrangement, the mode decoder 243a in the cache controller 243 decodes the contents of the mode designation field 91 of the request address, and if the data restoration mode is determined, a value obtained by subtracting 1 from the value (the number of set elements) set in the element number designation field 92 of the request address is set in the element counter 243b.

The cache controller 243 then executes a series of control operations (a) to (f):

(a) reads data from the cache memory 240 and decrements the element counter 243b;

(b) writes read data in FIFO memory 241;

(c) reads data from the cache memory 240 and FIFO memory 241 to the EX-OR 244, and decrements the element counter 243b;
(d) writes an EX-OR obtained by the EX-OR 244 in the FIFO memory 241;
(e) repeats (c) and (d) until the value of the elements counter 243b becomes "0"; and
(f) outputs an EX-OR obtained by the EX-OR 244 onto the PCI bus 25.

In this way, by assigning some bits of the request address to the element number designation field 92, data in a disk drive in any of various disk arrays having different numbers of elements can be restored using the identical cache controller 243 by EX-ORing data while repeating cache read for the number of elements indicated by the field 92-1.

However, when some bits of the request address (32 bits) are assigned to the element number designation field 92, the cache address designation field is expressed by 24 bits, and the capacity of the cache memory 240 must be reduced to $1/16$ as compared to that without the element number.designation field 92.

Figure 11:
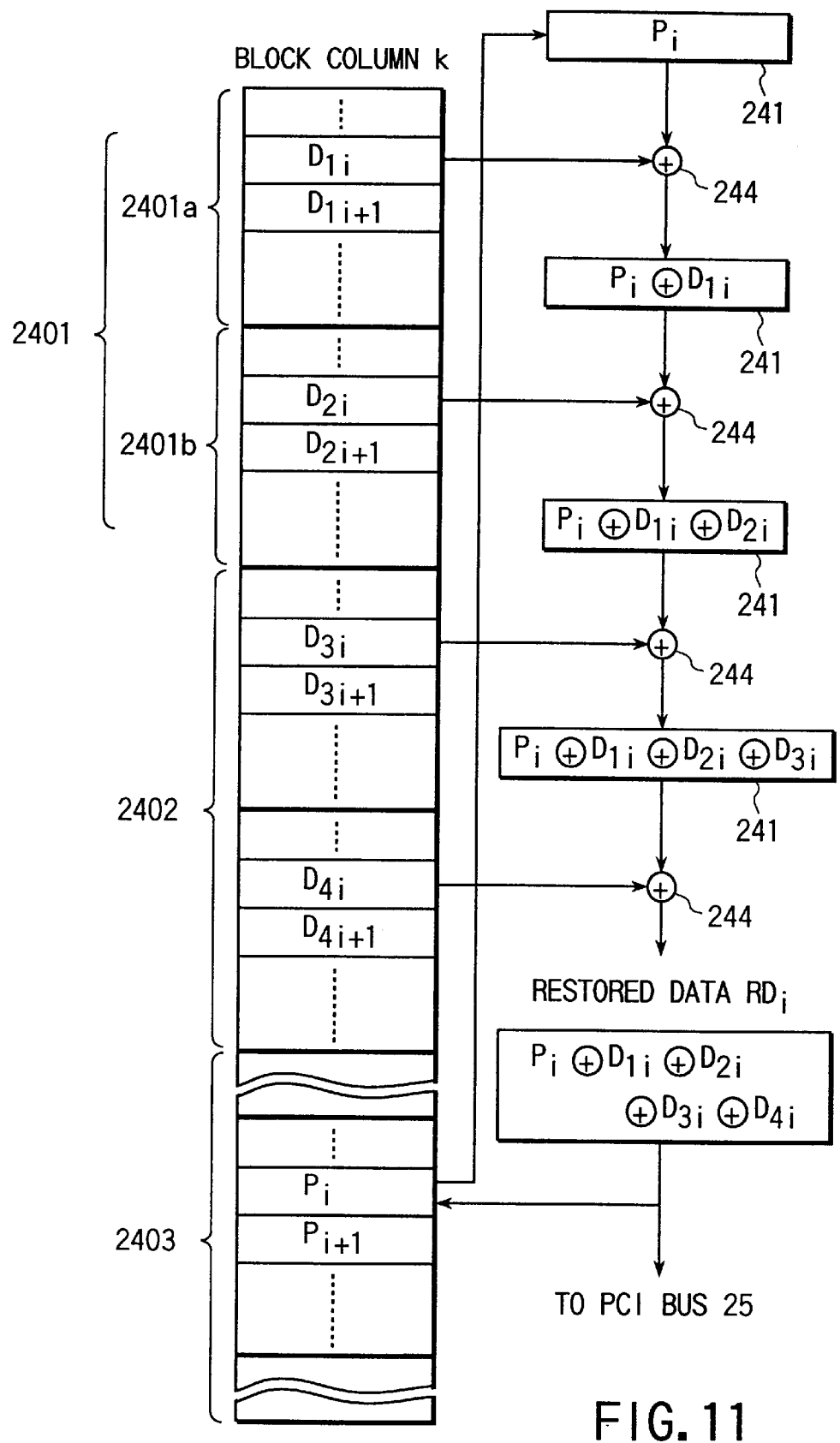
FIG. 11 is a view for explaining the sequence of data restoration when the number of elements is 6 and the request address format shown in FIG. 9 is applied.

FIG. 11 shows the sequence until restored data is acquired in the data restoration,mode when the number of elements is 6. In this case, prior to the data restoration mode, parity data Pi in the disk drives 10-0 through 10-3 must be written in a block (block in the update data area 2403) in the fifth or subsequent row in block k on the cache memory 240, corresponding data D1i and D2i in the disk drives 10-0 through 10-3 must be written in the first- and second-row blocks (first- and last-row blocks in the data/parity before update area 2401), and corresponding data D3i and D4i in the disk drives 10-0 through 10-3 must be written in the third- and fourth-row blocks (first- and last-row blocks in the restored data area 2402) in units of 32 bytes. When the request address having the 4-bit element number designation field 92 is used, data restoration of up to a disk array having 16 elements can be done in principle. However, for this purpose, the number of rows of blocks in the restored data area 2402 assured on the cache memory 240 must be increased from the current two rows (see FIG. 3) to 12 rows (16-2-2=12).

In this embodiment, when the disk array application scheme (RAID level) must be changed, the microprocessor 211 in the main controller 21 selects a cache control program for the corresponding RAID level stored in the ROM 212, and loads it onto the FPGA 245 in the disk cache section 24 via a control register (not shown). In this way, the cache memory control scheme can be easily changed to that corresponding to the required RAID level. When not only the RAID level but also the number of elements that builds the disk array is changed, such change can be easily coped with by loading the corresponding control program onto the FPGA 245. In this case, the element number designation field 91 shown in FIG. 9 need not be assured in the request address.

In the description of the above embodiment, the main controller 21 (the microprocessor 211 thereof) issues a cache access command to the disk cache section 24. Alternatively, the external I/O section 22 or disk I/O sections 23-0 through 23-5 may issue a command. In this case, the main controller 21 (the microprocessor 211 thereof) can control the external I/O section 22 or disk I/O section 23-j (i=0 through 5) to issue a command while designating the address of the disk cache section 24 (the cache memory 240 therein). In case of parity generation and data restoration (upon application of RAID5) that directly relate to the present invention, the disk I/O section 23-j issues the aforementioned special read command.

[Second Embodiment]

In the first embodiment, data before update and parity before update are stored in a predetermined area on the cache memory like update parity generation in RAID5. With this scheme, even when data before update has already been stored on the cache memory by another factor such as data read or the like, it must be copied onto the predetermined area. When a large number of update parity generation requests have been generated at the same time, a wait time may result due to limited capacity of the area on the cache memory. An embodiment that can solve such problem will be explained below.

Figure 12:
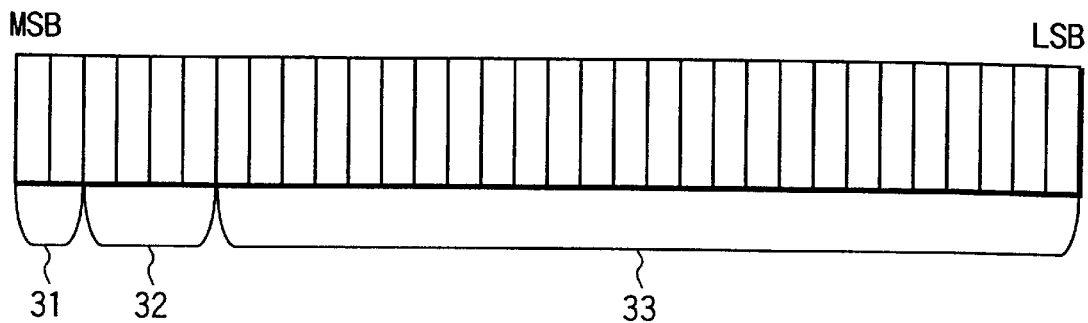
FIG. 12 shows the format of a request address used in the second embodiment of the present invention.

In this embodiment, a 32-bit address (request address) is appended to a command received from the PCI bus 25. As shown in FIG. 12, this address has a 2-bit mode designation field 31, 4-bit register designation field 32, and 26-bit intra-cache address designation field 33 from the MSB side.

The mode designation field 31 is used for designating a normal access mode that makes normal read/write to the cache memory 240, a parity generation mode for generating parity data using the cache memory 240 (i.e., reading out data from the cache memory 240 and using the readout data), and the like. In this case, when the contents of the mode designation field are "01", the normal access mode is designated; when they are "10", the parity generation mode is designated.

The register designation field 32 is used for selecting and designating one of set register sections 41-0, 41-1, ... (to be described later) in the parity generation mode. However, in the normal access mode, the field 32 is used for designating the upper 4 bits of a 30-bit cache memory address.

The intra-cache address designation field 33 is used for designating the lower address of the cache memory address. In the normal access mode, the entire intra-cache address designation field 33 is used for designating the lower 26 bits of the cache memory address. That is, in the normal access mode, a total of 30 bits, i.e., the register designation field 32 and intra-cache address designation field 33 designate the cache memory address. By contrast, in the parity generation mode, only the lower 14 bits in the intra-cache address designation field 33 are effective, and indicate an address in a block (size=16 KB) in the cache memory 240, i.e., the address within a block (relative location in a block). Note that the set register sections 41-0, 41-1, ... are used for designating the addresses (block addresses) of three blocks in the cache memory 240, as will be described later. In the parity generation mode, the cache memory address is designated by this block address (16 bits) and the lower 14 bits (address within a block) of the intra-cache address designation field 33.

The cache controller 243 discriminates if access to the cache memory 240 is the normal mode without parity generation, parity generation mode with parity generation, or the like, in accordance with the mode designation field 31 in the address (request address) appended to the command received by the PCI bus bridge 242, and controls the read/write timings and the like of the cache memory 240 in accordance with the discrimination result. The cache controller 243 outputs an address on the basis of the request address.

In this embodiment, the PCI bus bridge 242 and cache controller 243 construct a control means (cache control means) in the disk cache section 24, and are implemented using, e.g., the field programmable gate array (FPGA) 245 as a programmable logic device. The operation circuit of the FPGA 245 is determined by loading (programming) its internal logic from the interface (not shown) of the main controller 21 via a control register (not shown).

The EX-OR 244 generates parity data by EX-ORing data sent from the cache memory 240 or PCI bus bridge 242, and data read out from the FIFO memory 241.

Figure 13:
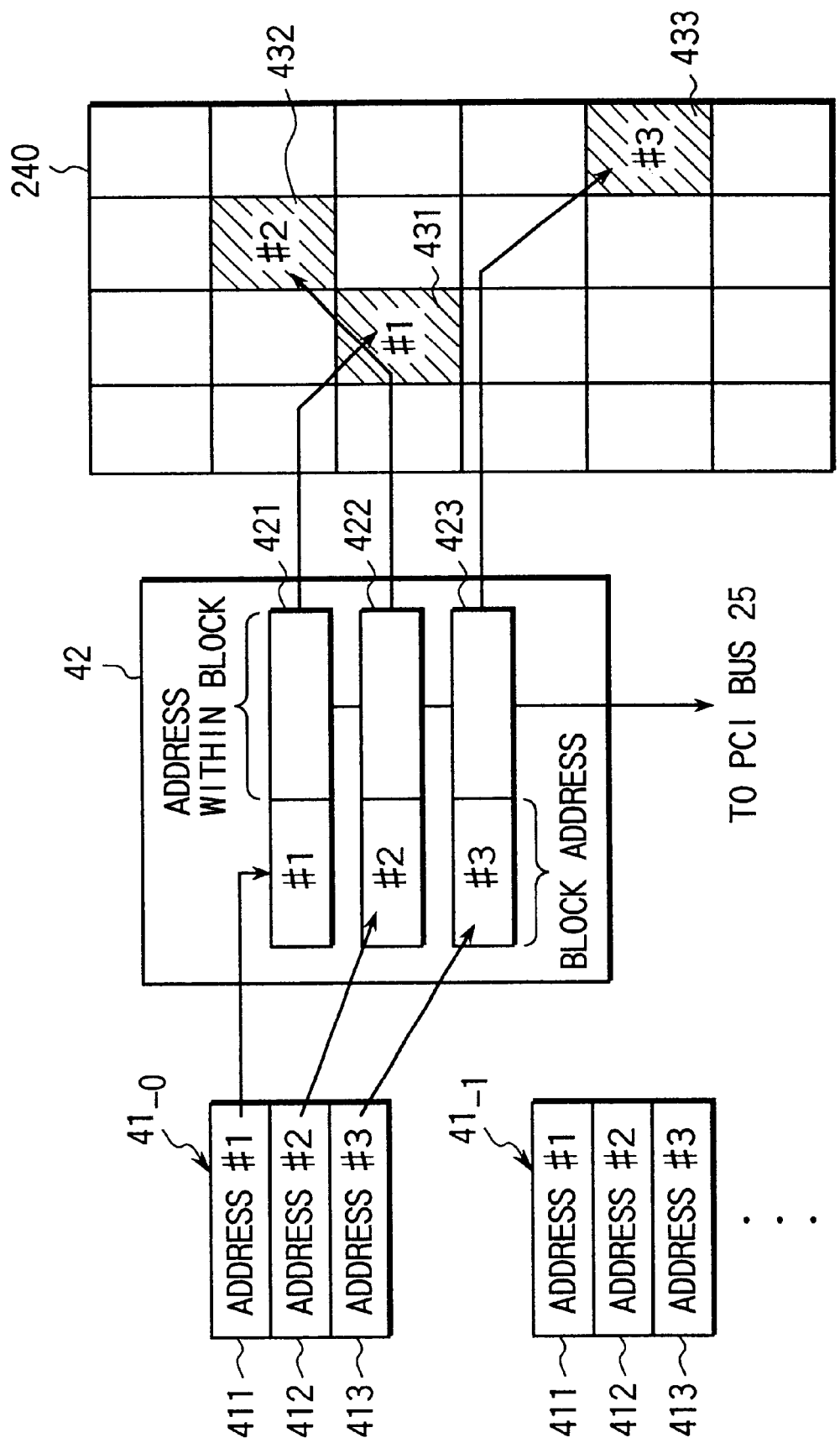
FIG. 13 is a block diagram showing the hardware arrangement for designating data in arbitrary blocks used in parity generation in the second embodiment.

The disk array controller 20 has a plurality of set register sections 41-0, 41-1, . . . , and a parity generation control circuit 42, as shown in FIG. 13. The parity generation control circuit 42 is implemented by the FPGA 245, and is located, e.g., in the cache controller 243.

The set register section 41-k (k=0, 1, . . . ) includes three set registers 411 through 413 for designating blocks in the disk cache section 24. The set register 411 is set with a block address for designating the block location in the cache memory 240, where, e.g., update data of update data written in the cache memory 240 upon data transfer from the host apparatus, data before update loaded from the disk array 10 side into the cache memory 240 to generate parity in RAID5 using the cache memory 240, and parity before update loaded from the disk array 10 into the cache memory 240, is stored. The set register 412 is set with a block address that designates the block location in the cache memory 240 where the data before update is stored, and the set register 413 is set with a block address that designates the block location in the cache memory 240 where the parity before update is stored.

The set register section 41-k is selected and designated by the register designation field 32 in the 32-bit address appended to the command received by the PCI bus bridge 242 via the PCI bus 25. In this embodiment, when the contents of the register designation field 32 are e.g., "0000", the set register section 41-k (k=0), i.e., the set register section 41-0, is designated; when they are "1000", the set register section k (k=1), i.e., the set register section 41-1, is designated. In this embodiment, since the register designation field 32 consists of 4 bits, a maximum of 16 set register sections 41-k can be prepared.

When the parity generation mode (in RAID5) is designated by the mode designation field 31 in the 32-bit address appended to the command received by the PCI bus bridge 242 via the PCI bus 25, the parity generation control circuit 42 executes control for generating update parity by sequentially reading out update data, and corresponding data before update and parity before update (parity data) from the cache memory 240, and EX-ORing the readout data, using three cache memory address registers 421 through 423. These cache memory address registers 421 through 423 are respectively set with information obtained by combining the 16-bit block addresses set in the set registers 411 through 413 in the set register section 41-k designated by the register designation field 32 in the 32-bit request address, and the lower 14 bits (the address within a block indicated thereby) of the intra-cache address designation field 33 of that request address, as 30-bit cache memory addresses.

The operations of this embodiment, i.e., normal read/write (normal access) to cache memory 240, and parity generation upon application of RAID5 using the cache memory 240, will be explained in turn below.

(1) Normal Read/write to Cache Memory

When the external I/O section 22 or disk I/O section 23-i requires some read/write access to the cache memory 240 in the disk cache section 24, it outputs a cache access command (cache read/write command) indicating it to the PCI bus bridge 242 in the disk cache section 24 via the PCI bus 25. This command is appended with, e.g., a 32-bit address (request address).

Upon receiving the command from the external I/O section 22 or disk I/O section 23-i via the PCI bus 25, the PCI bus bridge 242 determines the data flow direction from that command, and sends the command to the cache controller 243.

Upon reception of the command from the PCI bus bridge 242, the cache controller 243 refers to the upper 2 bits of the request address appended to that command, i.e., the mode designation field 31. If the field 31 is "01", the controller 243 determines the normal access mode; if the field 31 is "10", it determines the parity generation mode. The mode determination is implemented by, e.g., decoding the contents of the mode designation field 31.

Assuming that the request address is "40010000h" (last letter "h" indicates hexadecimal notation), since the upper 2 bits are "01", the normal access mode is determined. In the normal access mode, the lower 30 bits ("00100000h" in this case) of the request address are directly used for designating the 30-bit cache memory address.

The cache controller 243 controls cache read/write in the normal access mode as follows.

The cache controller 243 determines the data flow direction in accordance with the command received from the PCI bus bridge 242. The cache controller 243 then outputs and sets a cache memory address indicated by the lower 30 bits of the request address ("40010000h" in this case) appended to that command to the cache memory 240, and generates and outputs a control signal for read/write to the cache memory 240.

In response to this control signal, data read/write to a 32-byte area indicated by the designated cache memory address of the cache memory 240 is done.

The operation executed when the contents of the mode designation field 31 of the request address appended to a command received from the external I/O section 22 or disk I/O section 23-i via the PCI bus 25 are "01", i.e., normal access to the cache memory 240 is designated by the command output from the external I/O section 22 or disk I/O section 23-i, has been explained.

The command (cache read/write command) which designates normal access is used (a) when data on the disk drive 10-i requested from the host apparatus is read out from the cache memory 240 upon cache hit, i.e., if that requested data is also present on the cache memory 240, (b) when the requested data is written in the cache memory 240 upon cache misshit, i.e., if that requested data read out from the disk drive 10-i is not present on the cache memory 240, (c) when update data requested from the host apparatus is also written in the cache memory 240 upon writing that update data in the disk drive 10-i, (d) when data before update and parity (parity data) before update corresponding to the update data are written in the cache memory 240 in addition to the update data upon updating data in RAID5, and so forth.

(2) Parity Generation Upon.Application of RAID5

Parity generation upon application of RAID5 will be explained below with reference to FIGS. 13 and 14.

Upon reception of an update request of data on the disk drive 10-i (i=0 through 4) from the host apparatus upon application of RAID5, the external I/O section 22 sends a command (cache write command) that designates normal access to the cache controller 243 in the disk cache section 24 under the control of the microprocessor 211 in the main controller 21, and writes update data from the host apparatus in an area in an arbitrary block on the cache memory 240.

Likewise, the disk I/O sections 23-i and 23-j (j=0 through 4; for j≠i) send commands (cache write commands) for designating normal access of data before update on the disk drive 10-i corresponding to the update data from the host apparatus, and parity before update on another disk drive 10-j corresponding to the update data to the cache controller 243 under the control of the microprocessor 211 in the main controller 21 to load them into areas in arbitrary blocks. Note that when the corresponding data is already present on the cache memory 240, the command for that data need not be executed.

Note that the contents of the lower 14 bits of the 32-bit request address appended to the command (cache write command) used for writing the data before update or parity before update (i.e., the contents of the lower 14 bits of the intra-cache address designation field 33) match those of the lower 14 bits of the 32-bit request address appended to the command used for writing the corresponding update data (the contents of the lower 14 bits of the intra-cache address designation field 33). More specifically, the location in the block where the data before update or parity before update is loaded from the disk drive 10-i or 10-j into the cache memory 240, in other words, the location (relative location) in the block on the cache memory 240 where the data before update or parity before update is stored matches that in the block where the update data is written. The block addresses (each block address designated by a total of 16 bits including the 4 bits in the register designation field 32 and the upper 12 bits in the intra-cache address designation field 33) for designating the blocks where the update data, data before update, and parity before update are stored are respectively set in the set registers 411, 412, and 413 in an empty one of the set register sections 41-0, 41-1, . . . under the control of, e.g., the microprocessor 211 in the main controller 21.

With this control, in this embodiment, assume that the update data is written in an area starting from, e.g., the head location of an arbitrary block 431 on the cache memory 240, the data before update in an area starting from the head location of an arbitrary block 432, and the parity before update in an area starting from the head location of an arbitrary block 433, as shown in FIG. 13. Also, assume that the block addresses for designating the blocks 431, 432, and 433 where the update data, data before update, and parity before update are stored are respectively held in the set registers 411, 412, and 413 in the set register section 41-0.

After the update data, data before update, and parity before update have been prepared in the blocks 431, 432, and 433 on the cache memory 240 in this manner, the disk I/O section 23-j that requested write of the parity before update in the cache memory 240 outputs a special cache read command instructing generation and read of parity data to the PCI bus bridge 242 in the disk cache section 24 via the PCI bus 25. The 32-bit request address appended to this command is, e.g., "80010000h". More specifically, the mode designation field 31 of that request address is set with "10" designating the parity generation mode, the register designation field 32 is set with "0000" designating the set register section 41-0, and the lower 14 bits of the intra-cache address designation field 33 are set with the lower 14 bits of the start cache memory address previously used upon designating the normal access mode, i.e., address "01000h" in a block. On the other hand, when the set register section 41-1 is designated, since "1000" must be set in the register designation field 32, the request address becomes "A0010000h".

Upon receiving the cache read command that designates the parity generation mode via the PCI bus 25, the PCI bus bridge 242 determines the data flow direction from that command, and sends the command to the cache controller 243.

Upon reception of the command from the PCI bus bridge 242, the cache controller 243 refers to the mode designation field 31 in the 32-bit request address appended to that command. If the contents of the field 31 are "10" as in this example, the controller 243 determines that the parity generation mode is designated, and executes a sequence process for parity generation as follows.

In the parity generation mode, the cache controller 243 selects a set register section, designated by the contents "0000" in the register designation field 32 in the 32-bit request address "80010000h" appended to the received command, from the set register sections 41-0, 41-1, . . . . In this case, the set register section 41-0 is selected.

The cache controller 243 sets 16-bit block addresses held in the set registers 411, 412, and 413 in the selected set register section 41-0 in the upper 16-bit fields of the cache memory address registers 421, 422, and 423 in the parity generation control circuit 42, and sets the lower 14 bits of the intra-cache address designation field 33 of the request address in the lower 14-bit fields of the registers 421, 422, and 423. In this embodiment, the contents set in the cache memory address registers 421, 422, and 423 indicate the cache memory addresses which designate the blocks 431, 432, and 433 in the cache memory 240, where the update data, data before update, and parity before update were stored previously, and the storage locations in those blocks.

The cache controller 243 (the parity generation control circuit 42 therein) selects the cache memory address set in the cache memory address register 421 first and outputs it to the cache memory 240, and generates and outputs a control signal for data read with respect to the memory 240, thereby reading out 32-byte update data from the block 431 on the memory 240. The cache controller 243 then writes the readout data in the FIFO memory 241 via the PCI bus bridge 242, as indicated by an arrow 51 in FIG. 14.

Figure 14:
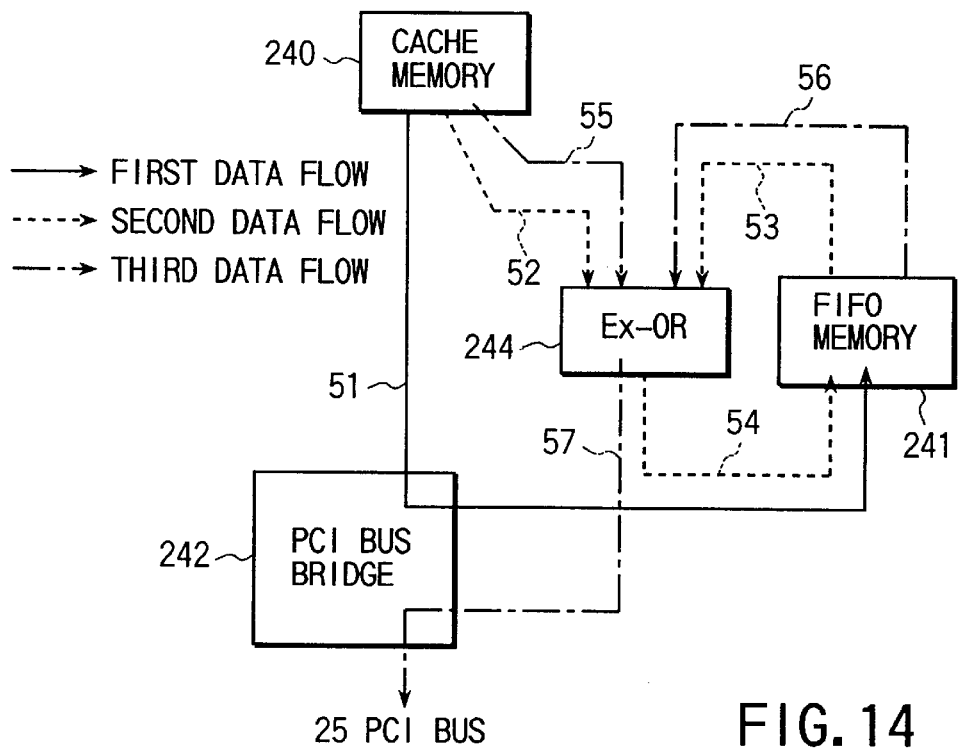
FIG. 14 is a view for explaining the data flow in parity generation in the second embodiment.

Upon completion of read of the update data, the cache controller 243 (the parity generation control circuit 42 therein) then selects the cache memory address set in the cache memory address register 422 and outputs it to the cache memory 240, and generates and outputs a control signal for data read with respect to the memory 240, thereby reading out 32-byte data before update from the block 432 on the memory 240 toward the EX-OR 244, as indicated by an arrow 52 in FIG. 14.

At the same time, the cache controller 243 reads out the update data previously written in the FIFO memory 241 toward the EX-OR 244, as indicated by an arrow 53 in FIG. 14.

The EX-OR 244 EX-ORs the update data read out from the FIFO memory 241 and the data before update read out from the cache memory 240 (the block 432 thereof) bit by bit. The (32-byte) EX-OR output from the EX-OR 244 is written in the FIFO memory 241 under the control of the cache controller 243, as indicated by an arrow 54 in FIG. 14.

Subsequently, upon completion of read of the data before update, the cache controller 243 (the parity generation control circuit 42 therein) selects the cache memory address set in the cache memory address register 423 in turn, and outputs it to the cache memory 240. Also, the cache.controller 243 generates and outputs a control signal for data read with respect to the memory 240, thereby reading out 32-byte parity before update from the block 433 on the memory 240 to the EX-OR 244, as indicated by an arrow 55 in FIG. 14.

At the same time, the cache controller 243 reads out the EX-OR (of the update data and data before update) previously written in the FIFO memory 241 toward the EX-OR 244, as indicated by an arrow 56 in FIG. 14.

The EX-OR 244 EX-ORs the previous EX-OR (of the update data and data before update) read out from the FIFO memory 241 and the parity before update read out from the cache memory 240 (the block 433 thereof) bit by bit. The (32-byte) EX-OR output from the EX-OR 244 serves as update parity (update parity data), and is output from the PCI bus bridge 242 onto the PCI bus 25, as indicated by an arrow 57 in FIG. 14.

As described above, in this embodiment, by issuing only a cache read command that instructs the parity generation command from the disk I/O section 23-j to the disk cache section 24, update data, and data before update and parity before update corresponding to the update data at locations in blocks designated by the lower 14 bits of the intra-cache address designation field 33 in the request address appended to the command are sequentially read out from the cache memory 240 from blocks (431, 432, and 433) in the cache memory 240 designated by the block addresses indicated by (the set registers 411, 412, and 413 which construct) the set register section 41-k designated by the register designation field 32 in the request address, and are EX-ORed by the EX-OR 244, thus automatically generating update parity designated by that command, and outputting it onto the PCI bus 25. That is, the disk I/O section 23-j need only output the cache read command designated with the parity generation mode, thereby outputting update parity corresponding to the update data designated by the command from the disk cache section 24 onto the PCI bus 25.

The update parity generated according to the cache read command designated with the parity generation mode from the disk I/O section 23-j and output onto the PCI bus 25 is read by the disk I/O section 23-j. The disk I/O section 23-j stores update parities in an area of the disk drive 10-j where old parities (parities before update) were stored every time the update parities read from the PCI bus 25, i.e., the update parities output (read) from the disk cache section 24 onto the PCI bus 25 (via the PCI bus bridge 242) have reached, e.g., one sector.

The disk I/O section 23-j outputs to the disk cache section 24 a cache read command, which has a request address that has been incremented by 32 bytes from the previous parity generation command and is designated with the parity mode. In response to this command, the next 32-byte update data, data before update, and parity before update are sequentially read out from the cache memory 240 and are EX-ORed under the control of the cache controller 243 in the disk cache section 24, thus generating the next 32-byte update parity and outputting it onto the PCI bus 25.

In this way, by repeating operation for generating update parity by sequentially reading out update data, data before update, and parity before update stored in arbitrary blocks on the cache memory on the basis of the contents (block addresses) set in the set registers 411, 412, and 413 in the set register section 41-k in units of 32 bytes (given data size units), and EX-ORing the readout data, update parities corresponding to all update data requested from the host apparatus can be generated without any copy process on the cache memory 240.

(Third Embodiment)

The second embodiment can be applied when the number of data (the number of reference data) used in parity generation (EX-ORing) in the disk cache section 24 is 3, but cannot cope with a case wherein the number of data is 4 or more, i.e., when the number of disk drives that form the disk array 10 changes, and the number of data to be referred to upon parity generation (EX-ORing) also changes. The third embodiment of the present invention, which can cope with a change in the number of reference data (the number of elements) upon parity generation (EX-ORing), will be explained below. Note that the basic arrangement of the disk array apparatus and that of the disk cache section 24 (in the disk array apparatus) are the same as those shown in FIGS. 1 and 2. Hence, the following description will quote FIGS. 1 and 2 for the sake of convenience.

Figure 15:
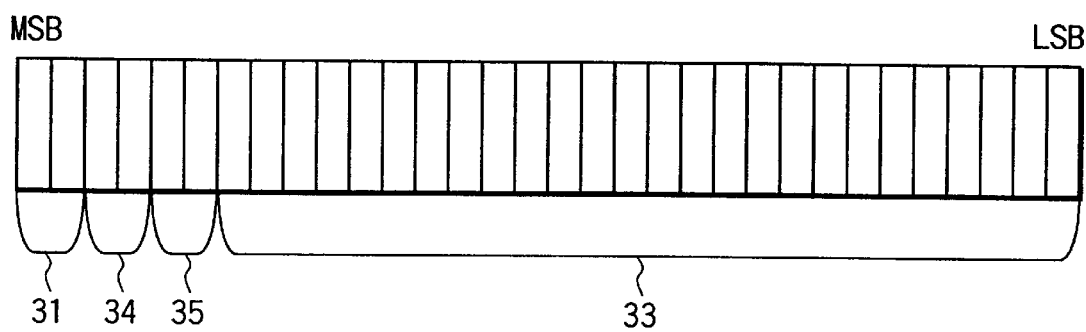
FIG. 15 shows the format of a request address used in the third embodiment of the present invention.

In this embodiment, the 4-bit register designation field 32 (see FIG. 12) in the 32-bit request address used in the third embodiment is divided into a 2-bit element number designation field 34 and register designation field 35, as shown in FIG. 15. The element number field 34 is used for designating the number of reference data (the number of elements) upon parity generation (EX-ORing). The register designation field 35 is used for designating one of a plurality of set register sections (which are similar to the set register sections 41-0, 41-1, . . . in the second embodiment).

Figure 16:
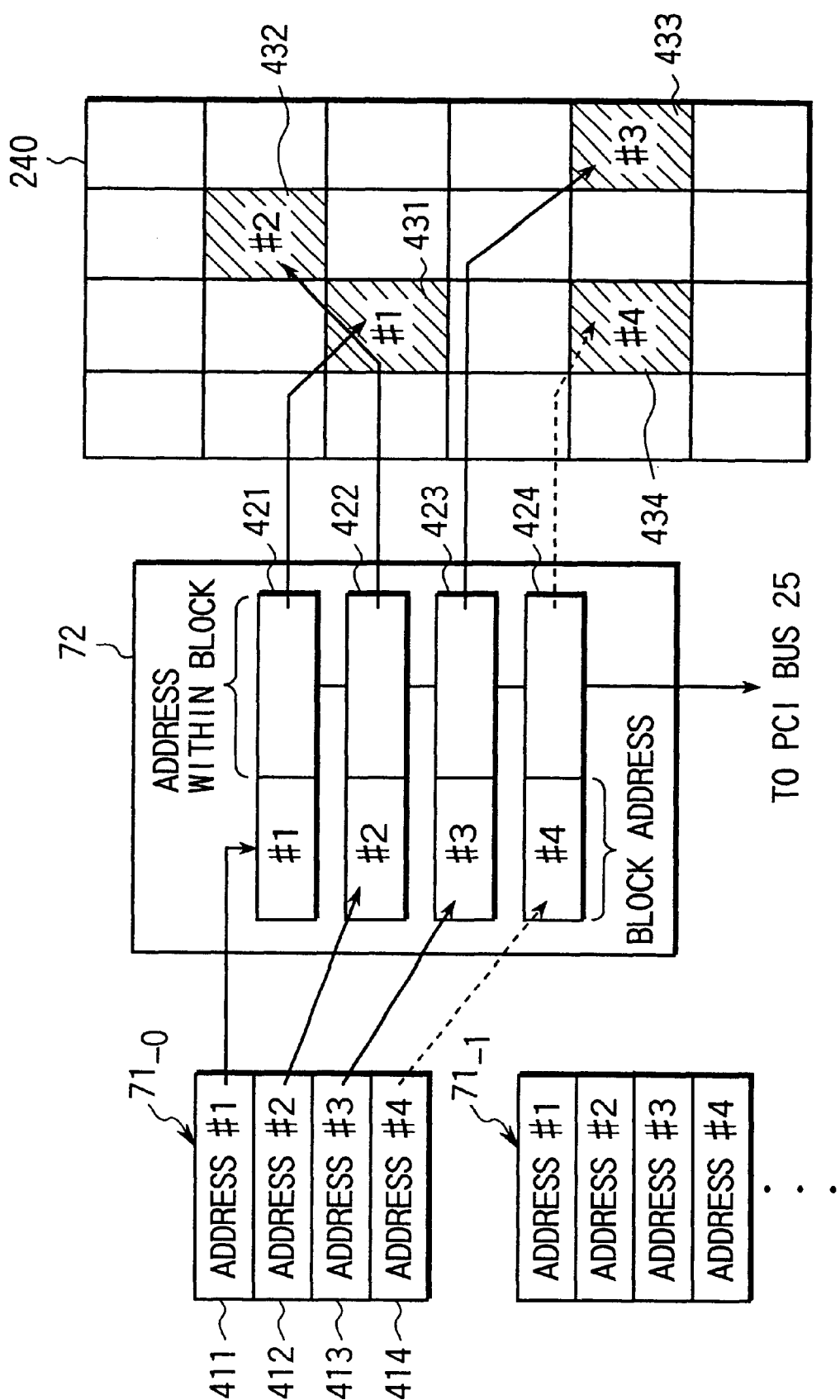
FIG. 16 is a block diagram showing the hardware arrangement for designating data in arbitrary blocks used in parity generation in the third embodiment.

In this embodiment, as shown in FIG. 16, set register sections 71-0, 71-1, . . . , and a parity generation control circuit 72 are provided in place of the set register sections 41-0, 41-1, . . . and parity generation control circuit 42 in FIG. 13. The set register section 71-k (k=0, 1, . . . ) include four set registers 411, 412, 413, and 414 unlike the set register section 41-k in FIG. 13. On the other hand, the parity generation control circuit 72 has four cache memory registers 421, 422, 423, and 424 unlike the parity generation control circuit 42 shown in FIG. 13. Note that the parity generation control circuit 72 is located in the cache controller 243 as in the parity generation control circuit 42.

In this embodiment, when the mode designation field 31 in a request address appended to a cache access command (cache read/write command) is "01", i.e., when the normal access mode is designated, the same operation as in the second embodiment is done. This embodiment is different from the second embodiment when the contents of the mode designation field 31 are "10", i.e., when the parity generation mode is designated.

In the parity generation mode, when the contents of the element number designation field 34 in the request address are "00", i.e., when the upper 4 bits in the request address are "1000", and, hence, the request address is "8xxxxxxxh" (x can assume any of 0h through fh), the number of reference data (the number of elements)=3 is designated.

In this case, the contents of the set registers 411 through 413 of the set registers 411 through 414 in the set register section 71-k designated by the register designation field 35 are set in the upper 16-bit fields in the registers 421 through 423 of the cache memory address registers 421 through 424 in the parity generation control circuit 72. In the lower 14-bit fields of these registers 421 through 423, the lower 14 bits of the intra-cache address designation field 33 in the request address are commonly set as an address within a block.

By designating cache memory addresses indicated by the three registers 421 through 423, data are sequentially read out from the three blocks 431 through 433 in the cache memory 240 and are EX-ORed by the EX-OR 244, thus generating parity data as in the first embodiment.

On the other hand, in the parity generation mode, when the contents of the element number designation field 34 in the request address are "10", i.e., when the upper 4 bits in the request address are "1010" and, hence, the request address is "Axxxxxxxh", the number of reference data (the number of elements)=4 is designated.

In this case, the contents of the set registers 411 through 414 in the set register section 71-k designated by the register designation field 35 are set in the upper 16-bit fields of the cache memory address registers 421 through 424 in the parity generation control circuit 72. The lower 14-bit fields of these registers 421 through 424 are commonly set with the lower 14 bits of the intra-cache address designation field 33 in the request address as an address within a block.

By designating the cache memory addresses indicated by the four registers 421 through 424, data are sequentially read out from the three blocks 431 through 433 in the cache memory 240 and are EX-ORed by the EX-OR 244, thus generating parity data. In this case, the number of reads of the previous EX-OR from the FIFO memory 241, the number of data reads from the cache memory 240, and the number of times of EX-ORing of the readout data are larger by one than those in the first embodiment.

With this control, even when the number of disk drives that form the disk array 10 has changed, and the number of reference data upon parity generation has changed, parity data can be simultaneously generated. Note that parity generation described in this embodiment includes data restoration upon application of RAID5, i.e., operation for restoring original data by EX-ORing data in the remaining normal disk drives when a failure has occurred in one of the disk drives that form the disk array 10. That is, parity generation in this embodiment indicates operation for sequentially reading out a plurality of data from the cache memory 240 and EX-ORing the readout data.

[Fourth Embodiment]

In the third embodiment, in order to allow simultaneous generation of parity data even when the number of drives in the disk array 10 is freely changed, the element number designation field 34 must be assured in the request address. However, since the element number designation field 34 is assured, the number of bits of the newly assured register designation field 35 is reduced to 2 as compared to the 4-bit register designation field 32 in the second embodiment, and the number of set register sections that can be designated is reduced from 16 to 4.

The fourth embodiment of the present invention which allows simultaneous generation of parity data without assuring any element number designation field in the request address even when the number of disk drives in the disk array 10 is freely changed will be explained below. Note that the basic arrangement of the disk array apparatus and that of the disk cache section 24 (in the disk array apparatus) are the same as those shown in FIGS. 1 and 2. Hence, the following description will quote FIGS. 1 and 2 for the sake of convenience.

In this embodiment, the request address has the format used in the second embodiment (see FIG. 12).

Figure 17:
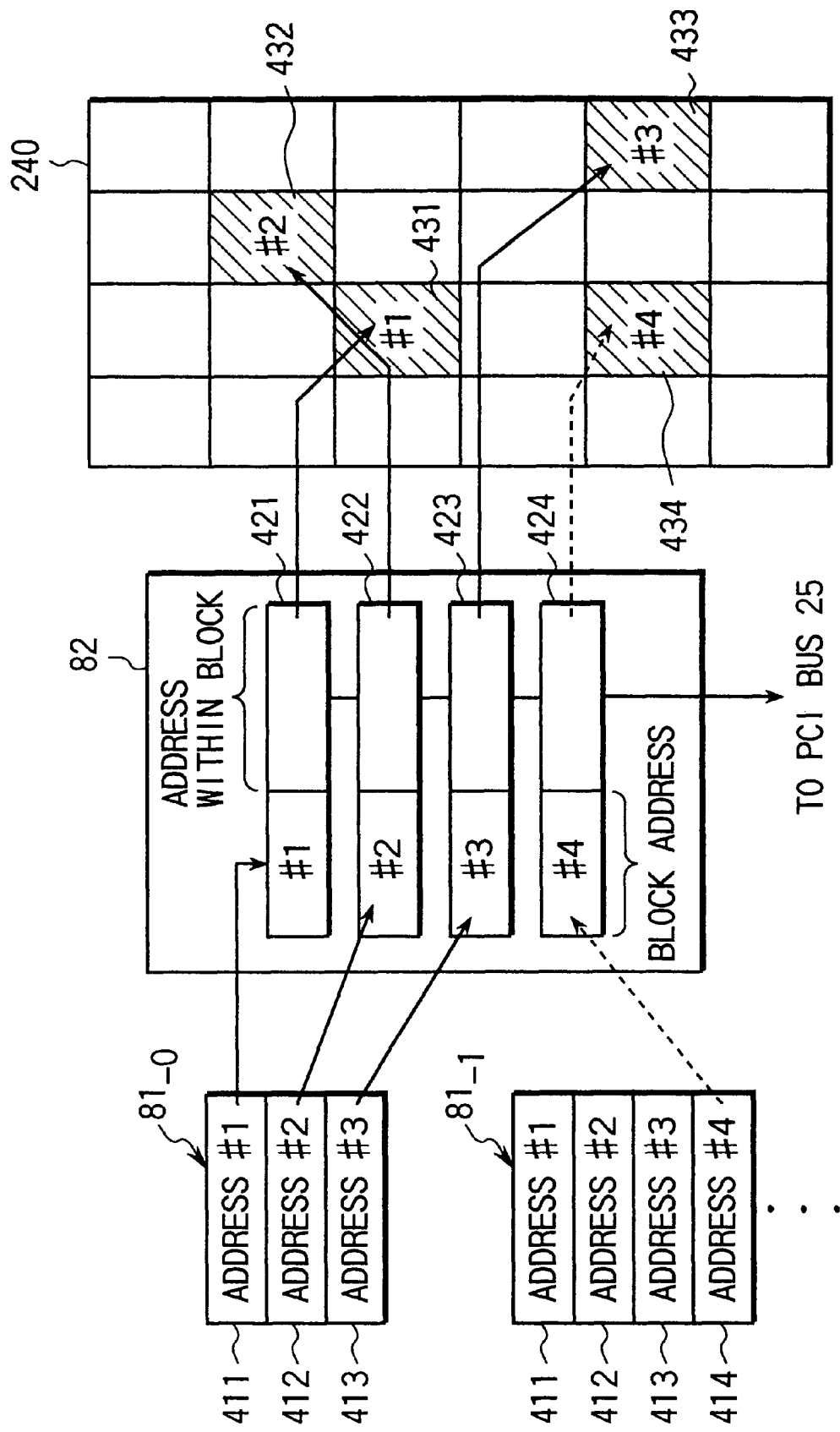
FIG. 17 is a block diagram showing the hardware arrangement for designating data in arbitrary blocks used in parity generation in the fourth embodiment of the present invention.

As one characteristic feature of this embodiment, a plurality of set register sections 81-0, 81-1, . . . having different numbers of building registers are provided in place of the set register sections 41-0, 41-1, . . . in FIG. 13, as shown in FIG. 17. For example, the set register section 81-0 is constructed by three set registers 411 through 413 as in the set registers and 41-1 in FIG. 13, and the set register section 81-1 is constructed by four registers 411 through 414 as in the set registers 71-0 and 71-1 in FIG. 16.

If N represents the maximum number of building registers of the set register sections 81-0, 81-1, . . . , the cache controller 243 comprises a parity generation control circuit 82 having N cache memory address registers. Assuming N=4, the parity generation control circuit 82 has four cache memory address registers 421 through 424 as in the parity generation control circuit 72 shown in FIG. 16.

In this embodiment, when the mode designation field 31 in a request address appended to a cache access command (cache read/write command) is "01", i.e., when the normal access mode is designated, the same operation as in the second and third embodiments is done. This embodiment is different from the second and third embodiments when the contents of the mode designation field 31 are "10", i.e., when the parity generation mode is designated.

In the parity generation mode, the register designation field in the request address not only designates the set register section 81-k but also designates the number of building registers of that set register section 81-k, i.e., the number of reference data upon parity generation. For example, when the contents of the register designation field 32 are "0000", i.e., when the request address is "80010000h", the set register section 81-0 is designated, and it is indicated that the number of building registers (the number of reference data) of that set register section 81-0 is 3. On the other hand, when the contents of the register designation field 32 are "1000", i.e., when the request address is "A0010000h", the set register section 81-1 is designated, and it is indicated that the number of building registers (the number of reference data) of that set register section 81-1 is 4.

In the parity generation mode, when the set register section that includes three set registers 411 through 413, e.g., the set register section 81-0, is designated by the register designation field 32 in the request address, the contents of these three set registers 411 through 413 are set in the upper 16-bit fields of the cache memory address registers 421 through 423 (the number of which is determined in advance by the value in the register designation field 32, i.e., is equal to the number of building registers of the set register section 81-0) of the registers 421 through 424 in the parity generation control circuit 82. The lower 14-bit fields of these registers 421 through 423 are commonly set with the lower 14 bits of the intra-cache address designation field 33 in the request address as an address within a block.

By designating the cache memory addresses indicated by the three registers 421 through 423, data are sequentially read out from three blocks 431 through 433 in the cache memory 240, and are EX-ORed by the EX-OR 244, thus generating parity data.

On the other hand, in the parity generation mode, when the set register section that includes four set registers 411 through 414, e.g., the set register section 81-1, is designated by the register designation field 32 in the request address, the contents of these four set registers 411 through 414 are set in the upper 16-bit fields of the cache memory address registers 421 through 424 (the number of which is determined in advance by the value in the register designation field 32, i.e., is equal to the number of building registers of the set register section 81-1) in the parity generation control circuit 82. The lower 14-bit fields of these registers 421 through 424 are commonly set with the lower 14 bits of the intra-cache address designation field 33 in the request address as an address within a block.

By designating the cache memory addresses indicated by the four registers 421 through 424, data are sequentially read out from three blocks 431 through 434 in the cache memory 240, and are EX-ORed by the EX-OR 244, thus generating parity data.

In this fashion, more set register sections can be designated by an address having a limited number of bits, and even when the number of disk drives in the disk array 10 is freely set, parity data can be simultaneously generated.

[Fifth Embodiment]

Figure 18:
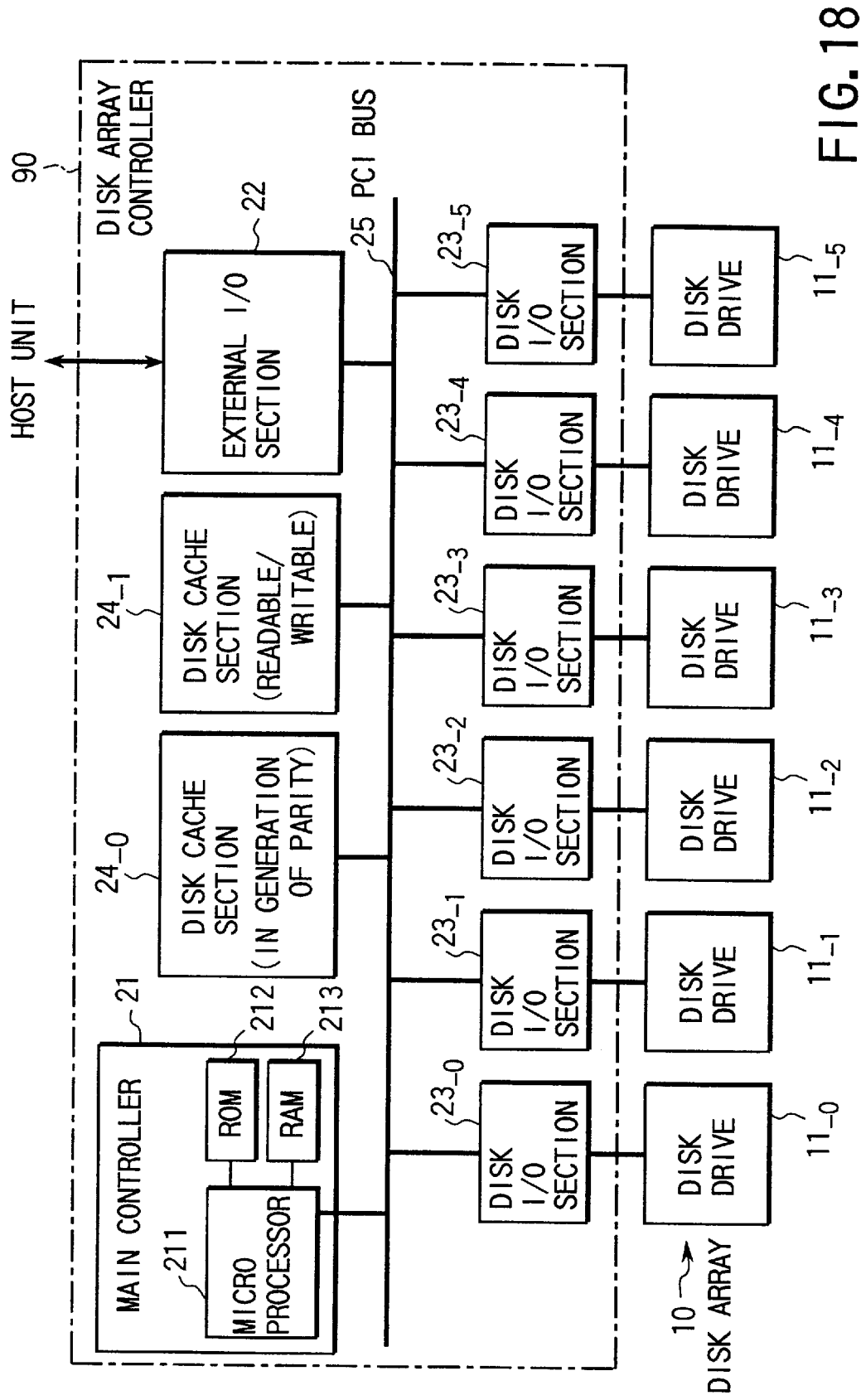
FIG. 18 is a block diagram showing the arrangement of a disk array apparatus comprising a disk array controller according to the fifth embodiment of the present invention.

FIG. 18 is a block diagram showing a disk array apparatus which comprises a disk array controller according to the fifth embodiment of the present invention. Note that the same reference numerals in FIG. 18 denote the same parts as in FIG. 1.

The characteristic feature of the arrangement shown in FIG. 18 is that a plurality of disk cache sections corresponding to the disk cache section 24 in FIG. 1, e.g., two disk cache sections 24-0 and 24-1 are provided, and cache memory access is distributed to these two disk cache sections 24-0 and 24-1.

In this arrangement, while, for example, the disk cache section 24-0 is generating parity, the disk cache section 24-1 can execute cache read/write in the normal access mode. In this way, the overhead of cache memory access upon parity generation can be reduced, and the system performance can be improved.

[Sixth Embodiment]

Figure 19:
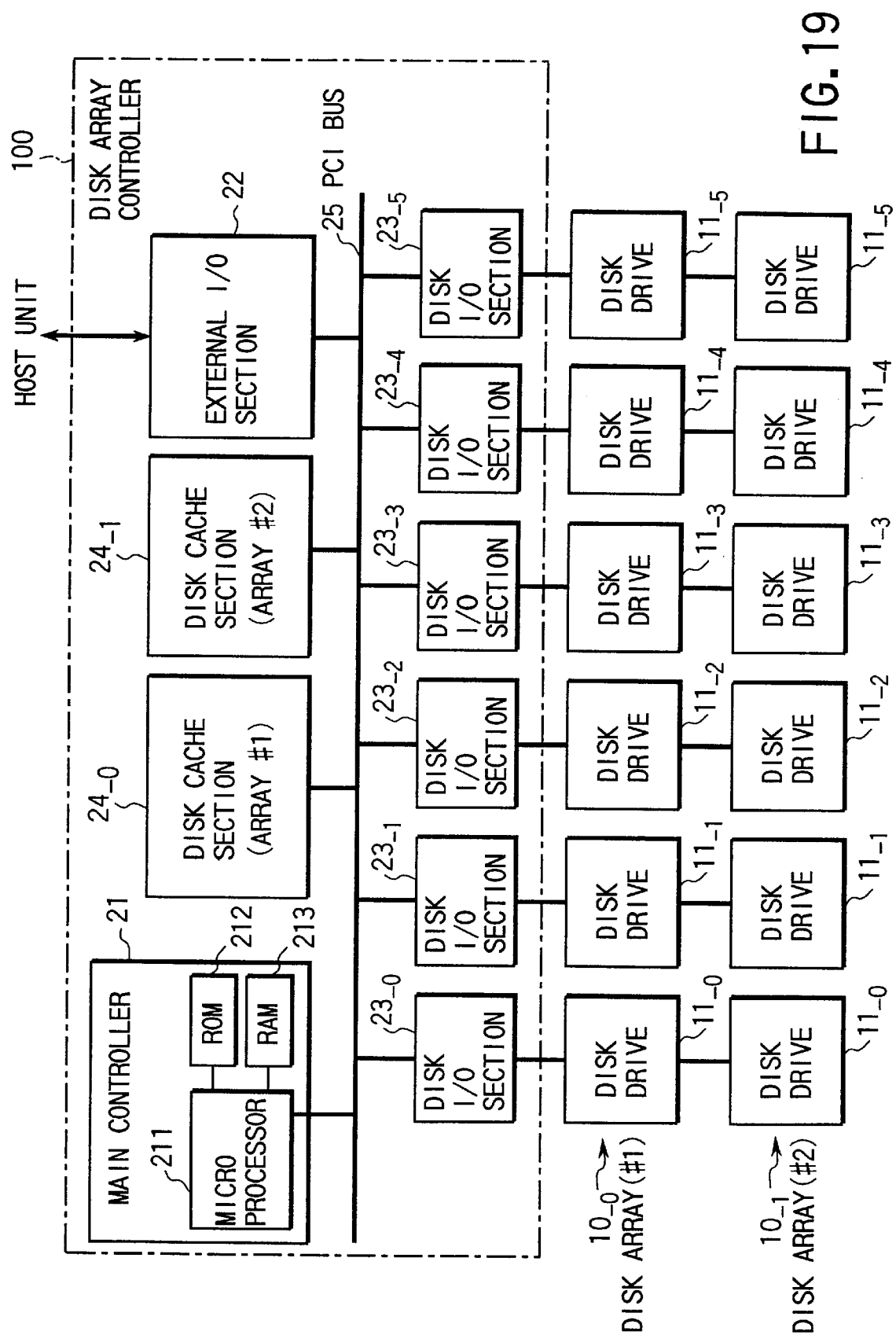
FIG. 19 is a block diagram showing the arrangement of a disk array apparatus comprising a disk array controller according to the sixth embodiment of the present invention.

FIG. 19 is a block diagram showing a disk array apparatus which comprises a disk array controller according to the sixth embodiment of the present invention. Note that the same reference numerals in FIG. 19 denote the same parts as in FIG. 18.

The characteristic feature of the arrangement shown in FIG. 19 lies in that a plurality of disk arrays corresponding to the disk array 10 shown in FIG. 18, e.g., two disk arrays 10-0 and 10-1, are provided, and disk cache sections 24-0 and 24-1 are provided in correspondence with these disk arrays 10-0 and 10-1.

When the disk cache sections are provided in units of disk arrays, the processing time required for parity generation in a given disk cache section can be prevented from influencing other disk arrays, and the system performance can be improved. Also, since disk access is done in units of disk arrays, data management is facilitated by providing disk cache sections in units of disk arrays.

[Seventh Embodiment]

Figure 20:
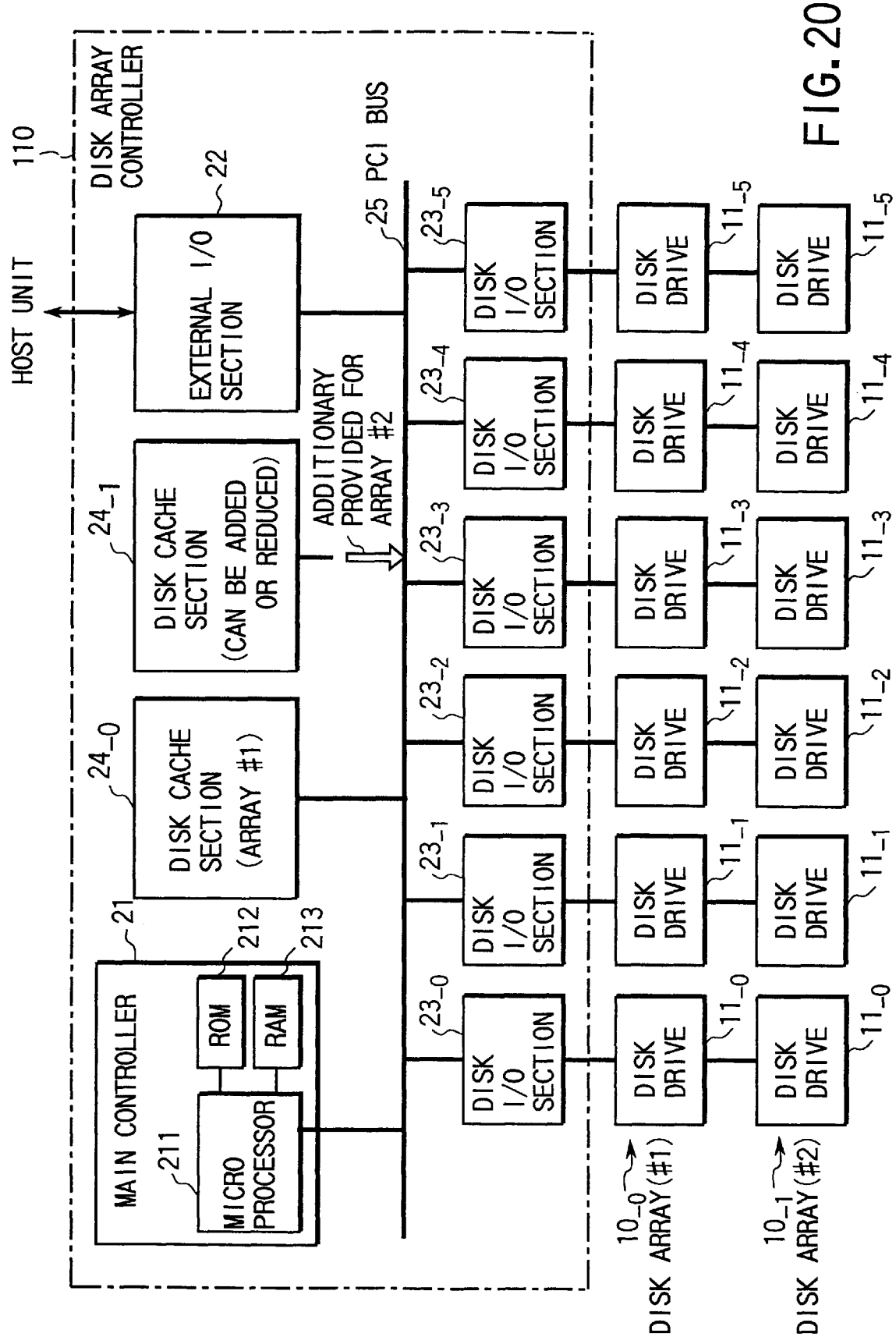
FIG. 20 is a block diagram showing the arrangement of a disk array apparatus comprising a disk array controller according to the seventh embodiment of the present invention.

FIG. 20 is a block diagram showing a disk array apparatus which comprises a disk array controller according to the seventh embodiment of the present invention. Note that the same reference numerals in FIG. 20 denote the same parts as in FIG. 19.

The characteristic feature of the arrangement shown in FIG. 20 lies in that the disk cache sections 24-0 and 24-1 in the arrangement shown in FIG. 19 can be freely built in or disconnected from the system, i.e., the number of disk cache sections can be increased/decreased in accordance with the disk arrays used and required cost.

In such arrangement, when the apparatus comprises the two disk arrays 10-0 and 10-1 like the example shown in FIG. 20, if only one disk cache section 24-0 is built in the system in terms of cost, the disk cache section 24-0 can be shared by the disk arrays 10-0 and 10-1. On the other hand, when the disk cache section 24-1 can be added, if the disk cache section 24-0 is used for the disk array 10-0 and the disk cache section 24-1 is used for the disk array 10-1, the same effect as in the sixth embodiment can be provided.

[Eighth Embodiment]

In the embodiments described above, the locations of the set register sections in the disk array controller 20 and routes upon setting block addresses in the set registers in each set register section are not particularly prescribed. For example, the set register sections may be located in the cache controller 243, and the block addresses may be set via the PCI bus. The eighth embodiment in which the set register sections are located in the cache controller 243 will be described below with reference to the accompanying drawings.

Figures 21, 22:
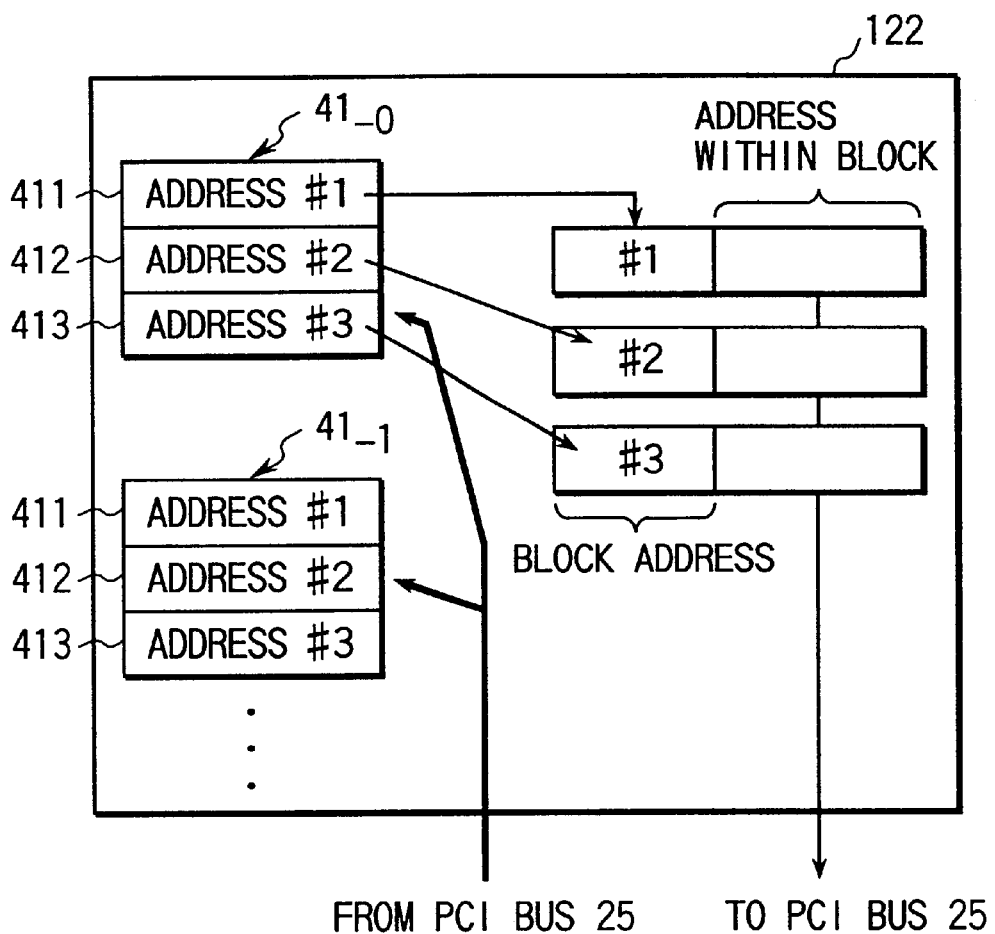
FIG. 21 is a block diagram showing the hardware arrangement in a cache controller 243 for designating data in arbitrary blocks used in parity generation in the eighth embodiment of the present invention.
FIG. 22 shows an example of an address map used in the eighth embodiment.

FIG. 21 shows an example in which the set register sections 41-0, 41-1, ... in FIG. 13 are located in the cache controller 243. In this example, the set register sections 41-0, 41-1, ... are located in a parity generation control circuit 122 (corresponding to the parity generation control circuit 42 in FIG. 13) provided to the cache controller 243.

In the arrangement shown in FIG. 21, set registers (set registers 411 through 413 in this example) that construct each set register section 41-k (k=0, 1, ...) are connected to the PCI bus 25. These set registers are assigned addresses within, e.g., the range from "E0000000h" through "E000FFFFh" of a memory address space indicated by the 32-bit request address, and can be accessed by the microprocessor 211 in the main controller 21 or the like in FIG. 1 using a memory address (request address) via the PCI bus 25. FIG. 22 shows an example of address assignment to the respective set registers and the like in the memory address space.

In such arrangement, operation for setting (writing) block addresses indicating block locations in the cache memory 240, where data used in parity generation are stored, in the set registers in the set register section 41-k can be executed by, e.g., the microprocessor 211 via the PCI bus 25. In this way, since write to the set registers in the set register section 41-k can be done via the PCI bus 25 used in data transfer, the independence of the disk cache section 24 can be improved. Also, since the PCI bus 25, i.e., a standard bus, can be used, the present invention can be applied to systems such as a versatile personal computer and the like.

Note that the arrangement shown in FIG. 21 can be similarly applied not only to the set register sections shown in FIG. 13 but also to those shown in FIGS. 16 and 17.

[Ninth Embodiment]

In the description of the eighth embodiment, the microprocessor 211 can set (write) the block addresses in the set registers (that construct the set register section) via the PCI bus 25. However, the present invention is not limited to such specific arrangement. Hence, the ninth embodiment which allows the microprocessor 211 to directly set block addresses in the set registers without the intervention of the PCI bus 25 will be explained below with reference to the accompanying drawings.

Figure 23:
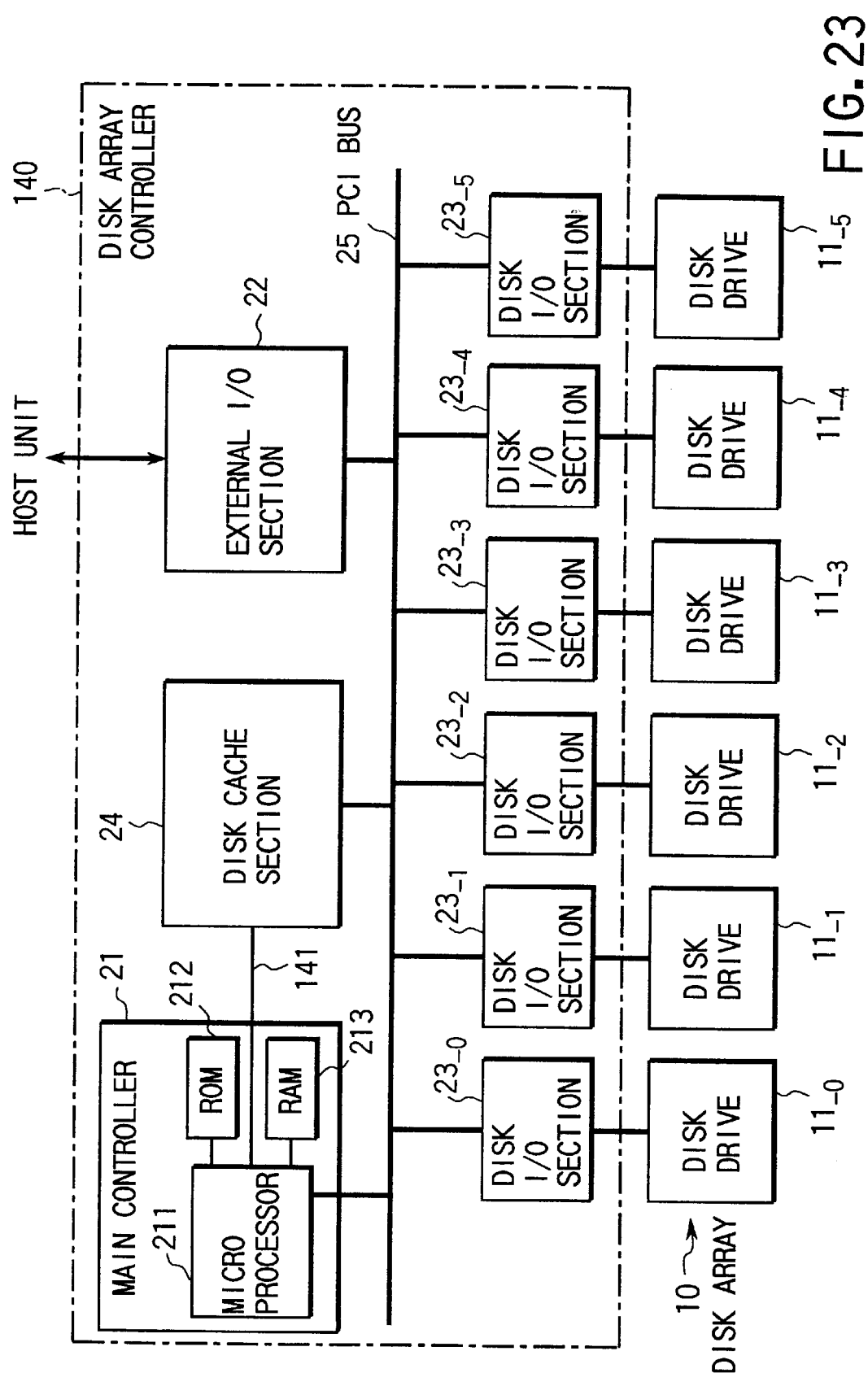
FIG. 23 is a block diagram showing the arrangement of a disk array apparatus comprising a disk array controller according to the ninth embodiment of the present invention.

FIG. 23 is a block diagram showing the arrangement of a disk array apparatus which comprises a disk array controller according to the ninth embodiment of the present invention. The same reference numerals in FIG. 23 denotes the same parts as those in FIG. 1.

The characteristic feature of the arrangement shown in FIG. 23 lies in that an internal bus (microprocessor bus) 141 which allows the microprocessor 211 to directly access elements in the disk cache section 24 without the intervention of the PCI bus 25 is inserted between the microprocessor 211 and disk cache section 24.

Figure 24:
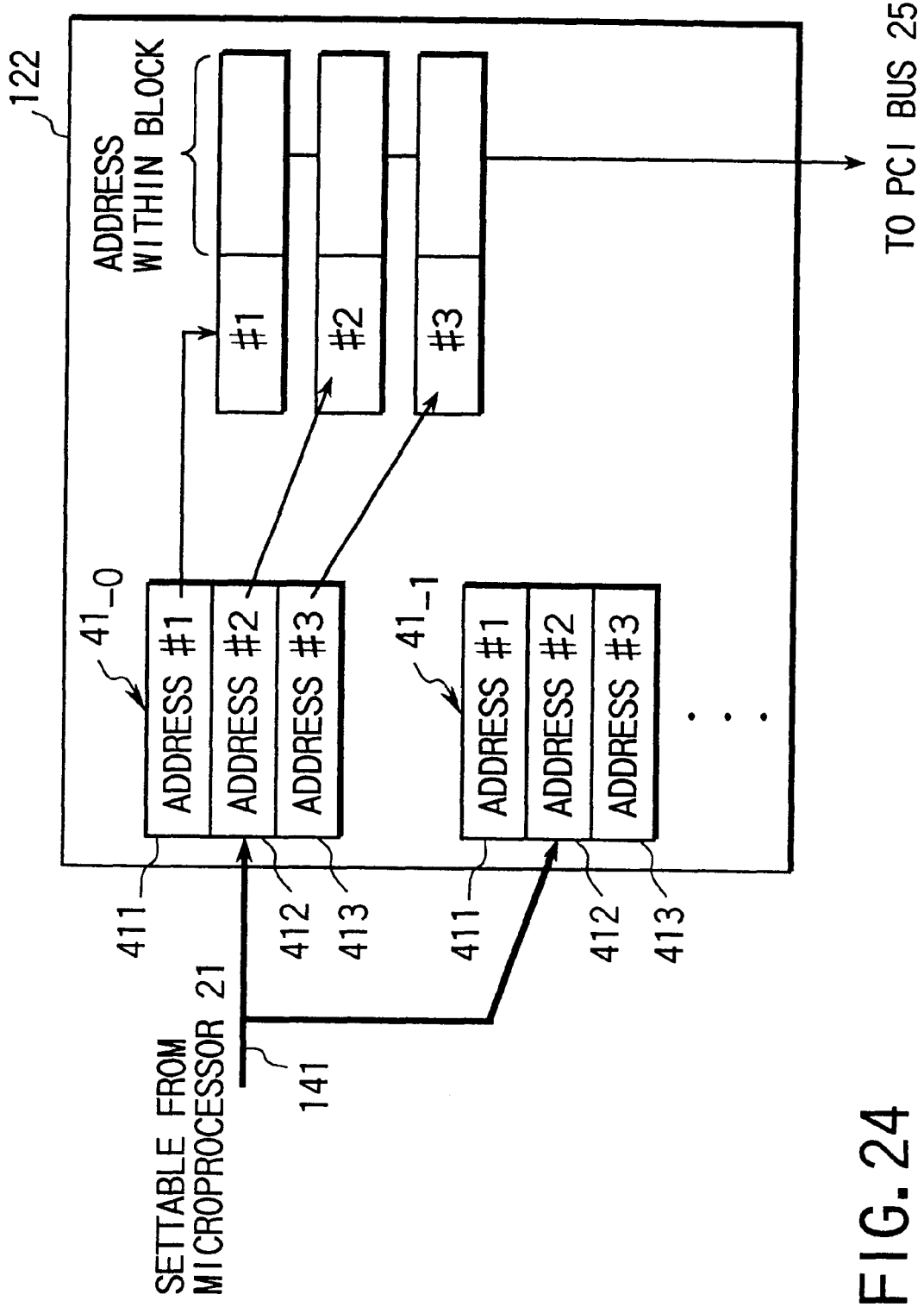
FIG. 24 is a block diagram showing the hardware arrangement in a cache controller 243 for designating data in arbitrary blocks used in parity generation in the ninth embodiment.

In this embodiment, the set register sections 41-0, 41-1, ... are located in a parity generation control circuit provided to the cache controller 243 in the disk cache section 24, as shown in FIG. 24. This arrangement is the same as the eighth embodiment. However, in this embodiment, set registers (set registers 411 through 413 in this embodiment) that construct each set register section 41-k (k=0, 1, ...) are connected to the internal bus 141 of the microprocessor 211 in place of the PCI bus 25. These set registers are assigned some addresses of an address space used by the microprocessor 211, and can be accessed by the microprocessor 211 via the internal bus 141.

In this arrangement, even during the period of data transfer via the PCI bus 25, the microprocessor 211 can set block addresses in the set registers in the set register section 41-k via the internal bus 141, thus reducing the overhead of data transfer, and improving the system performance.

Note that the arrangement shown in FIG. 24 can be similarly applied not only to the set register sections shown in FIG. 13 but also to those shown in FIGS. 16 and 17.

In the description of the above embodiments, a cache read command designating the parity generation mode is output from the disk I/O section 23-j under the control of the main controller 21 (the microprocessor 211 therein). Alternatively, the cache read command may be output from the main controller 21 (the microprocessor 211 therein).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk array controller comprising:

main control means;

external input/output means for controlling input/output with an external host apparatus;

disk drive input/output means for connecting a group of disk drives which form a disk array for storing data from the host apparatus;

a standard bus for data transfer, to which said external and disk drive input/output means, and disk cache means are connected;

a plurality of register groups each including three registers in which a block address for designating a block in a cache memory where update data transferred from the host apparatus is stored, a block address for designating a block in the cache memory where data before update read from the disk drive is stored, and a block address for designating a block in the cache memory where parity data before update are stored so as to generate parity data using the update data; and said disk cache means having said cache memory which is managed in units of blocks to temporarily store transfer data between the disk drive and host apparatus, said disk cache means including:

an EX-OR circuit for EX-ORing two data bit by bit; and cache control means for, when a specific cache read command appended with a request address, which includes a register designation field for designating one of said plurality of register groups, and an intra-cache address designation field indicating an address in a block of said cache memory, is received from one of said main control means and disk drive input/output means to generate parity data in correspondence with update data transferred from the host apparatus, sequentially reading out update data, data before update, and parity data before update stored at locations designated by the intra-cache address designation field of the request address from the blocks in said cache memory indicated by contents set in the register group designated by the register designation field of the request address, and making said EX-OR circuit EX-OR the readout data, so as to generate parity data as an EX-OR of the readout update data, data before update, and parity data before update.

2. The controller according to claim 1, wherein the request address appended to the cache read command also includes a mode designation field for designating one of a normal access mode for reading out one data from said cache memory, and a parity generation mode for generating parity data by sequentially reading out a plurality of data from said cache memory, and EX-ORing the readout data, and when said cache control means receives the cache read command, said cache control means selectively outputs one data in said cache memory designated by the request address or parity data obtained by EX-ORing a plurality of data in said cache memory in accordance with a mode designated by the mode designation field of the request address appended to the command.

3. The controller according to claim 1, wherein said disk cache means comprises two cache means and one of said two cache means reads/writes data from/to said cache memory while the other disk cache means is generating parity data.

4. The controller according to claim 1, further comprising a plurality of disk arrays, wherein each of the plurality of disk arrays has a corresponding disk cache means.

5. The controller according to claim 1, wherein said register groups are located in said cache control means in said disk cache means, and said main control means can set the block addresses in the registers that construct the individual register groups via said standard bus.

6. The controller according to claim 1, wherein said main control means and at least said cache control means in said disk cache means are connected by an internal bus which is provided independent from said standard bus, said register groups are located in said cache control means, and said main control means can set the block addresses in the registers that construct the individual register groups via the internal bus.

7. A disk array controller comprising:

main control means;

external input/output means for controlling input/output with an external host apparatus;

disk drive input/output means for connecting a group of disk drives which form a disk array for storing data from the host apparatus;

a standard bus for data transfer, to which said external and disk drive input/output means, and disk cache means are connected;

a plurality of register groups each including N registers which are respectively set with block addresses for designating blocks in a cache memory where a maximum of N (N is an integer not less than 4) data used in EX-ORing are independently stored; and said disk cache means having said cache memory which is managed in units of blocks to temporarily store transfer data between the disk drive and host apparatus, said disk cache means including:

an EX-OR circuit for EX-ORing two data bit by bit; and cache control means for, when a specific cache read command appended with a request address, which includes a register designation field for designating one of said plurality of register groups, an element number designation field for designating the number of data used in parity generation, and an intra-cache address designation field indicating an address in a block in said cache memory, is received from one of said main control means, and said external and disk drive input/output means, selecting predetermined registers, the number of which is designated by the element number designation field of the request address, sequentially reading out data stored at locations designated by the intra-cache address designation field of the request address from blocks in said cache memory indicated by contents set in the selected registers, and making said EX-OR circuit EX-OR the readout data, so as to generate parity data as an EX-OR of the readout data.

8. A disk array controller comprising:

main control means;

external input/output means for controlling input/output with an external host apparatus;

disk drive input/output means for connecting a group of disk drives which form a disk array for storing data from the host apparatus;

a standard bus for data transfer, to which said external and disk drive input/output means, and disk cache means are connected;

a plurality of register groups each including a plurality of registers which are respectively set with block addresses for designating blocks in a cache memory where a plurality of data used in EX-ORing are independently stored, the number of registers included in each register group being determined by an address for designating the register group, and ranging from 3 (inclusive) to N (inclusive: N is an integer not less than 4); and said disk cache means having said cache memory which is managed in units of blocks to temporarily store transfer data between the disk drive and host apparatus, said disk cache means including:

an EX-OR circuit for EX-ORing two data bit by bit; and cache control means for, when a specific cache read command appended with a request address, which includes a register designation field for designating one of said plurality of register groups, and an intra-cache address designation field indicating an address in a block in said cache memory, is received from one of said main control means, and said external and disk drive input/output means, selecting the register group designated by the register designation field of the request address, sequentially reading out data stored at locations designated by the intra-cache address designation field of the request address from blocks in said cache memory, the number of which matches the number of building registers of the register group determined by a value of the register designation field, and which are indicated by contents set in registers that construct the register group, and making said EX-OR circuit EX-OR the readout data, so as to generate parity data as an EX-OR of the readout data.

9. A disk array controller comprising:

main control means;

external input/output means for controlling input/output with an external host apparatus;

disk drive input/output means for connecting a disk drive group including N disk drives which form a disk array for storing data from the host apparatus; and disk cache means having a cache memory which is managed in units of blocks to temporarily store transfer data between the disk drives and host apparatus, said cache memory being assigned within a predetermined address range and having a first area in which update data is written, a second area, in which data before update and parity data before update read from one of the N disk drives are temporarily written to have a predetermined positional relationship under the control of said main control means, within a predetermined address range, so as to allow generation of parity data on the basis of data before update and parity data before update corresponding to the update data transferred from the host apparatus, said disk cache means including:

an EX-OR circuit for EX-ORing two data bit by bit; and cache control means for, when a specific cache access command appended with a request address which indicates a storage location of update data in said cache memory is supplied from one of said main control means and disk drive input/output means so as to generate parity data corresponding to the update data transferred from the host apparatus, sequentially reading out the update data at the storage location in said cache memory indicated by the request address, and data before update and parity data before update at storage locations in the second area, which correspond to the storage location of the update data, and making said EX-OR circuit EX-OR the readout data, so as to generate parity data as an EX-OR of the readout update data, data before update, and parity data before update;

wherein a third area serving as an extended area of the second area used in data restoration is assured on said cache memory, one of said main control means and said disk drive input/output means comprises parity generation preprocessing means for, when a failure has occurred in one of the N disk drives and data in the failed disk drive must be restored from data and parity data in the remaining N−1 disk drives, writing data or parity data of each of the remaining N−1 disk drives in a block in the first area on said cache memory and N−2 blocks having a predetermined positional relationship therebetween in the second and third areas, and command issuing means for sending a cache access command which has a mode designation field set with information for designating a data restoration mode of various modes including a parity generation mode for parity generation, and the data restoration mode for data restoration, and is appended with the request address indicating the storage location in the first area, and when said cache control means receives the cache access command appended with the request address in which the data restoration mode is designated by the mode designation field, said cache control means sequentially reads out data or parity data from a location in a block in the first area on said cache memory, which is indicated by the request address, and locations in N−2 blocks in the second and third areas, which correspond to the location in the block, and makes said EX-OR circuit EX-OR the readout data, so as to generate restored data as an EX-OR of the read out N−2 data and one parity data.

10. The controller according to claim 9, wherein the storage locations in the blocks where the data before update and parity data before update are to be read out from the second area of said cache memory by said cache control means are offset by a block size.

11. The controller according to claim 9, wherein said cache control means externally outputs the restored data, and replaces data used in data restoration stored in the first area by the restored data.

12. A disk array controller comprising:

main control means;

external input/output means for controlling input/output with an external host apparatus; disk drive input/output means for connecting a disk drive group including N disk drives which form a disk array for storing data from the host apparatus; and disk cache means having a cache memory which is managed in units of blocks to temporarily store transfer data between the disk drives and host apparatus, said cache memory being assigned within a predetermined address range and having a first area in which update data is written, a second area, in which data before update and parity data before update read from one of the N disk drives are temporarily written to have a predetermined positional relationship under the control of said main control means, within a predetermined address range, so as to allow generation of parity data on the basis of data before update and parity data before update corresponding to the update data transferred from the host apparatus, said disk cache means including:

an EX-OR circuit for EX-ORing two data bit by bit; and cache control means for, when a specific cache access command appended with a request address which indicates a storage location of update data in said cache memory is supplied from one of said main control means and disk drive input/output means so as to generate parity data corresponding to the update data transferred from the host apparatus, sequentially reading out the update data at the storage location in said cache memory indicated by the request address, and data before update and parity data before update at storage locations in the second area, which correspond to the storage location of the update data, and making said EX-OR circuit EX-OR the readout data, so as to generate parity data as an EX-OR of the readout update data, data before update, and parity data before update;

wherein a third area serving as an extended area of the second area used in data restoration is assured on said cache memory, one of said main control means and said disk drive input/output means comprises data restoration preprocessing means for, when a failure has occurred in one of the N disk drives and data in the failed disk drive must be restored from data and parity data in the remaining N-1 disk drives, writing data or parity data of each of the remaining N-1 disk drives in a block in the first area on said cache memory and N-2 blocks having a predetermined positional relationship therebetween in the second and third areas, and command issuing means for sending a cache access command which has a mode designation field set with information for designating a data restoration mode of various modes including a parity generation mode for parity generation, and the data restoration mode for data restoration, and an element number designation field set with the number of elements, which indicates the number of disk drives that form the disk array, and is appended with the request address indicating the storage location in the first area, and when said cache control means receives the cache access command appended with the request address in which the data restoration mode is designated by the mode designation field, said cache control means determines the number N-2 of data to be read out from the second and third areas on said cache memory to restore data an the basis of the number N of element designated by the element number designation field of the request address, sequentially reads out data or parity data from a location in a block in the first area on said cache memory, which is indicated by the request address, and locations in N-2 blocks in the second and third areas, which correspond to the location in the block, and makes said EX-OR circuit EX-OR the readout data, so as to generate restored data as an EX-OR of the read out N-2 data and one parity data.

13. The controller according to claim 12, wherein the storage locations in the blocks where the data or parity data of the N-2 disk drives are to be read out from the second and third areas of said cache memory by said cache control means are offset by a block size.

14. A disk array controller comprising:

main control means;

external input/output means for controlling input/output with an external host apparatus;

disk drive input/output means for connecting a group of disk drives which form a disk array for storing data from the host apparatus;

a standard bus for data transfer, to which said external and disk drive input/output means, and disk cache means are connected;

a plurality of register groups each including three registers in which a block address for designating a block in a cache memory where update data transferred from the host apparatus is stored, a block address for designating a block in the cache memory where data before update read from the disk drive is stored, and a block address for designating a block in the cache memory where parity data before update are stored so as to generate parity data using the update data; and said disk cache means having said cache memory which is managed in units of blocks to temporarily store transfer data between the disk drive and host apparatus, said disk cache means including:

an EX-OR circuit for EX-ORing two data bit by bit; and cache control means for, when a specific cache read command appended with a request address, which includes a register designation field for designating one of said plurality of register groups, and an intra-cache address designation field indicating an address in a block of said cache memory, is received from one of said main control means and disk drive input/output means to generate parity data in correspondence with update data transferred from the host apparatus, sequentially reading out update data, data before update, and parity data before update stored at locations designated by the intra-cache address designation field of the request address from the blocks in said cache memory indicated by contents set in the register group designated by the register designation field of the request address, and making said EX-OR circuit EX-OR the readout data, so as to generate parity data as an EX-OR of the readout update data, data before update, and parity data before update;

wherein the request address appended to the cache read command also includes a mode designation field for designating one of a normal access mode for reading out one data from said cache memory, and a parity generation mode for generating parity data by sequentially reading out a plurality of data from said cache memory, and EX-ORing the readout data, and when said cache control means receives the cache read command, said cache control means selectively outputs one data in said cache memory designated by the request address or parity data obtained by EX-ORing a plurality of data in said cache memory in accordance with a mode designated by the mode designation field of the request address appended to the command.

15. A cache control method applied to a disk array controller which comprises external input/output means for controlling input/output with an external host apparatus, disk drive input/output means for connecting a group of disk drives which form a disk array for storing data from the host apparatus, a standard bus for data transfer, to which said external and disk drive input/output means, and disk cache means are connected, and main control means for controlling the respective means, comprising the steps of:

storing update data transferred from the host apparatus at a location in an arbitrary block in said cache memory, and setting block addresses for designating blocks in said cache memory where the update data, and data before update and parity data before update corresponding to the update data are stored in one of a plurality of register groups each including three registers; and executing, when one of said main control means and said disk drive input/output means supplies a specific cache read command appended with a request address, which includes a register designation field for designating one of said plurality of register groups, and an intra-cache address designation field indicating an address in a block of said cache memory, to said disk cache means to generate parity data, a sequence process by sequentially reading out update data, data before update, and parity data before update stored at locations designated by the intra-cache address designation field of the request address from the blocks in said cache memory indicated by contents set in the register group designated by the register designation field of the request address, and EX-ORing the readout data using an EX-OR circuit, so as to generate the parity data as an EX-OR of the readout update data, data before update, and parity data before update.

16. A cache control method applied to a disk array controller which comprises external input/output means for controlling input/output with an external host apparatus, disk drive input/output means for connecting a group of disk drives which form a disk array for storing data from the host apparatus, a standard bus for data transfer, to which said external and disk drive input/output means, and disk cache means are connected, and main control means for controlling the respective means, comprising the steps of:

storing n data (n is an integer ranging from 3 (inclusive) to N (inclusive), and N is an integer not less than 4) used in parity data generation by EX-ORing at locations in an identical number of arbitrary blocks in said cache memory, and setting block addresses for respectively designating the n blocks in predetermined n registers in one of a plurality of register groups each including N registers; and executing, when one of said main control means and said disk drive input/output means supplies a specific cache read command appended with a request address, which includes a register designation field for designating one of said plurality of register groups, an element number designation field for designating the number of data used in parity generation, and an intra-cache address designation field indicating an address in a block of said cache memory, to said disk cache means to generate the parity data, a sequence process by selecting predetermined registers, the number of which is designated by the element number designation field of the request address, from the register group designated by the register designation field, sequentially reading out data stored at locations designated by the intra-cache address designation field of the request address from the blocks in said cache memory indicated by contents set in the selected registers, and EX-ORing the readout data using an EX-OR circuit, so as to generate parity data as an EX-OR of the readout data.

17. A cache control method applied to a disk array controller, which comprises external input/output means for controlling input/output with an external host apparatus, disk drive input/output means for connecting a disk drive group including N disk drives which form a disk array for storing data from the host apparatus, disk cache means having a cache memory which is managed in units of blocks to temporarily store transfer data between the disk drive and host apparatus, and main control means for controlling the respective means, comprising the steps of:

assigning within a predetermined address range on said cache memory a first area in which update data is written, and a second area, in which data before update and parity data before update read from one of the N disk drives are temporarily written to have a predetermined positional relationship under the control of said main control means, so as to allow generation of parity data on the basis of data before update and parity data before update corresponding to the update data transferred from the host apparatus;

issuing a specific cache access command appended with a request address which indicates a storage location of update data in said cache memory from one of said main control means and disk drive input/output means to said disk cache means;

EX-ORing, in accordance with the predetermined positional relationship, the update data written in said first area and data before update and parity data before update in said second area to generate parity data, when the specific cache read command is issued;

assigning a third area serving as an extended area of the second area using in data restoration on said cache memory;

writing, when a failure has occurred in one of the N disk drives and data in the failed disk drive must be restored from data and parity data in the remaining N−1 disk drives, data or parity data of each of the remaining N−1 disk drives in a block in the first area on said cache memory and N−2 blocks having a predetermined positional relationship therebetween in the second and third areas; and then issuing a cache access command, which has a mode designation field set with information for designating a data restoration mode of various modes including a parity generation mode for parity generation, and the data restoration mode for data restoration, and is appended with the request address indicating the storage location in the first area, from one of said main control means and disk drive input/out means to said disk cache means; and executing, when said disk cache means receives the cache access command appended with the request address in which the data restoration mode is designated by the mode designation field, the sequence process by sequentially reading out data or parity data from a location in a block in the first area on said cache memory, which is indicated by the request address, and locations in N−2 blocks in the second and third areas, which correspond to the location in the block, and EX-ORing the readout data, so as to generate restored data as an EX-OR of the read out N−2 data and one parity data.

* * * * *

UNITED STATES PATENT AND TRADEMARK OFFICE
CERTIFICATE OF CORRECTION

PATENT NO. : 6,415,355 B1
DATED : July 2, 2002
INVENTOR(S) : Hirofuji

It is certified that error appears in the above-identified patent and that said Letters Patent is hereby corrected as shown below:

Column 37,
Line 62, change "data an" to -- data on --.

Column 39,
Line 8, change "the-host" to -- the host --.

Column 40,
Line 54, change "input/out" to -- input/output --.

Signed and Sealed this

Thirty-first Day of December, 2002

JAMES E. ROGAN
*Director of the United States Patent and Trademark Office*